(12) United States Patent
Sakurai et al.

(10) Patent No.: US 11,780,288 B2
(45) Date of Patent: Oct. 10, 2023

(54) VEHICLE CABIN AIRFLOW FORMING DEVICE

(71) Applicant: Toyota Jidosha Kabushiki Kaisha, Toyota (JP)

(72) Inventors: Hideyuki Sakurai, Toyota (JP); Masashi Mori, Nagoya (JP); Katsuya Shimazu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 16/700,564

(22) Filed: Dec. 2, 2019

(65) Prior Publication Data

US 2020/0171915 A1 Jun. 4, 2020

(30) Foreign Application Priority Data

Dec. 4, 2018 (JP) .................. 2018-227693

(51) Int. Cl.
*B60H 1/00* (2006.01)
*B60H 1/24* (2006.01)

(52) U.S. Cl.
CPC ..... *B60H 1/00742* (2013.01); *B60H 1/00564* (2013.01); *B60H 1/00864* (2013.01); *B60H 1/00871* (2013.01); *B60H 1/245* (2013.01)

(58) Field of Classification Search
CPC ............ B60H 1/00742; B60H 1/00564; B60H 1/00864; B60H 1/00871; B60H 1/245; B60H 1/00978; B60H 1/246; B60H 1/247; B60H 1/00; B60H 1/262; B60H 1/34; B60H 3/0007; B60H 3/0608; B60H 2001/3485; B60H 1/00035; B60H 1/00064; B60H 1/00285; B60H 2001/00235; B60H 2001/00221; B60H 1/00207; B60H 2001/00728; B60H 1/265; B60H 1/267;

(Continued)

(56) References Cited

U.S. PATENT DOCUMENTS 2,526,560 A * 10/1950 Hans .................. B60H 1/00371
454/100
4,450,755 A * 5/1984 Catan ...................... F04D 17/04
415/204

(Continued)

FOREIGN PATENT DOCUMENTS

DE 102015226384 A1 6/2017
EP 0503987 A1 9/1992

(Continued)

OTHER PUBLICATIONS

Extended European Search Report dated Apr. 29, 2020 in European Appln. No. 19212235.6.

*Primary Examiner* — Steven B McAllister
*Assistant Examiner* — Cole N Friedman
(74) *Attorney, Agent, or Firm* — Dinsmore & Shohl LLP

(57) ABSTRACT

A vehicle cabin airflow forming device includes an airflow forming unit. The airflow forming unit is configured to form airflows circulating around seating space of a seat and form, as part of the airflows, an ascending airflow on one lateral side of the seating space, and a descending airflow on the other lateral side of the seating space. The seat is provided inside a vehicle cabin, and the airflows circulate around the seating space as viewed from a front side of the seat.

10 Claims, 16 Drawing Sheets

(58) Field of Classification Search
CPC ...... B60N 2/5628; B60N 2/68; B60N 2/5657; B60N 2/565; B60J 9/04; F24F 2009/005; F24F 9/00; F24F 2009/007; F24F 2009/002; A47C 7/74; A47C 7/742; A47C 7/744
USPC ...... 454/75, 189, 188, 190, 191; 297/180.14
See application file for complete search history.

(56) References Cited

U.S. PATENT DOCUMENTS

| | | | | |
|---|---|---|---|---|
| 5,001,905 | A * | 3/1991 | Miyazaki | B60H 1/00371 454/161 |
| 5,450,894 | A * | 9/1995 | Inoue | B60H 1/00842 454/907 |
| 11,279,206 | B1 * | 3/2022 | Mueller | B60H 1/247 |
| 2005/0282485 | A1 | 12/2005 | Kato et al. | |
| 2005/0282486 | A1 * | 12/2005 | Takeda | B60N 2/56 454/158 |

FOREIGN PATENT DOCUMENTS

| | | |
|---|---|---|
| JP | 56-083522 U | 7/1981 |
| JP | S61109816 U | 7/1986 |
| JP | 05-050848 A | 3/1993 |
| JP | 2004-268704 A | 9/2004 |
| JP | 2006-001493 A | 1/2006 |
| JP | 2007-203794 A | 8/2007 |
| JP | 2015-104980 A | 6/2015 |

\* cited by examiner

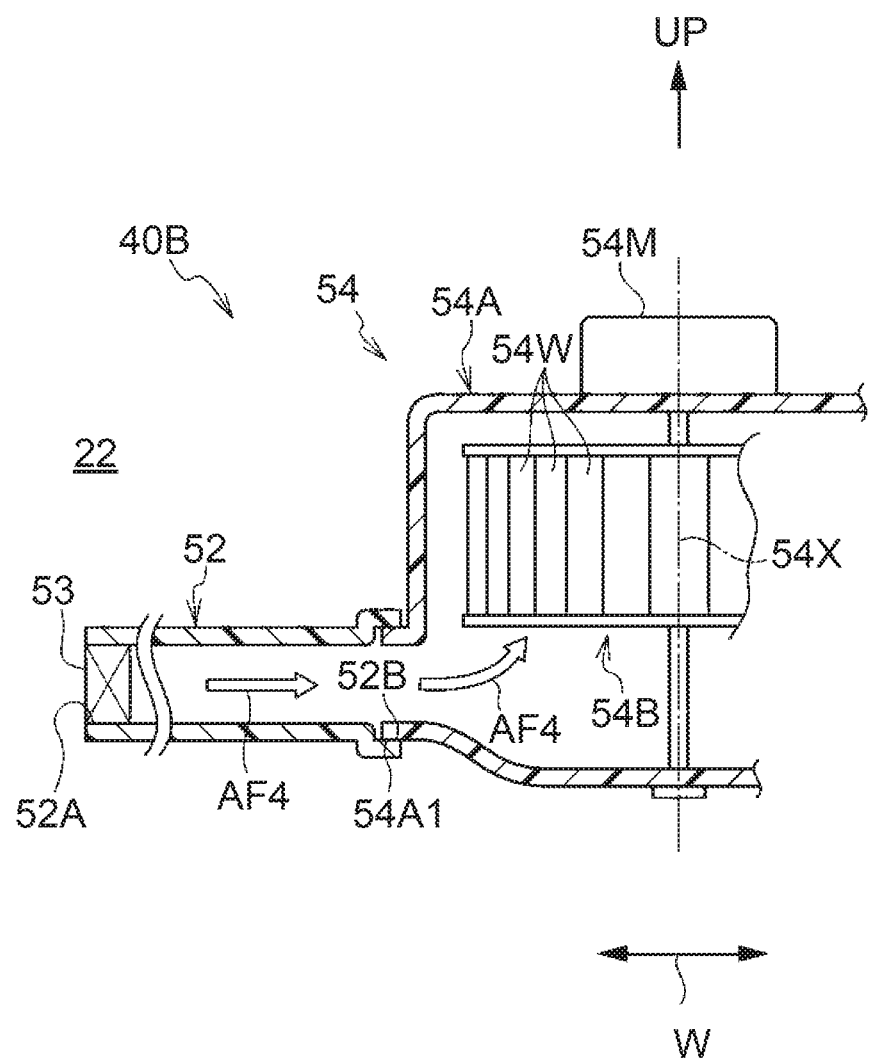

VEHICLE CABIN AIRFLOW FORMING DEVICE

CROSS-REFERENCE TO RELATED APPLICATIONS

This application claims priority to Japanese Patent Application No. 2018-227693 filed on Dec. 4, 2018, which is hereby incorporated by reference in its entirety including the drawings.

BACKGROUND

1. Technical Field

The present disclosure relates to a vehicle cabin airflow forming device.

2. Description of Related Art

A configuration including an air conditioner that forms airflows in a vehicle is known (for example, see Japanese Patent Application Publication No. 2007-203794, Japanese Patent Application Publication No. 2006-1493, and Japanese Patent Application Publication No. 2004-268704). For example, JP 2007-203794 A below discloses a vehicle air conditioner that blows air into a vehicle cabin from air blowing ports of a duct extending in the vehicle front-rear direction on the ceiling side. Briefly describing, in this technique, the air blowing ports are respectively provided on the front side and the rear side with respect to a position directly above the occupant head position. The front air blowing port faces the downwardly rear side of the vehicle and has an opening area larger than an opening area of the rear air blowing port, and the rear air blowing port faces the front air blowing port.

In such a configuration, an airflow blown out from the rear air blowing port collides with an airflow blown out from the front air blowing port toward the vehicle-rear lower side, to thereby form an airflow flowing vehicle-downward and along the front side of an occupant. A part of the airflow blown out from the rear air blowing port is also blown out toward the vicinity of the back head of the occupant. Hence, the occupant can have a pleasant cool feeling by these airflows.

SUMMARY

Meanwhile, there is sometimes such a case that occupants are seated in seats adjacent to each other in the left-right direction of the seats (also referred to as a "seat width direction") in the vehicle cabin, and they desire to enjoy their own favorite scents and room temperatures.

However, in the above technique, even if the airflows are formed for the respective seats adjacent to each other in the left-right direction of the seats in the vehicle cabin, scents and heat easily move in the left-right direction of the seats; thus, it may be sometimes difficult to provide a space favored by each occupant in each seat.

In the meantime, JP 2007-203794 A also discloses a modification in which the air blowing ports are arranged on the left and right sides, instead of the front and rear sides. However, in this modification, the airflows formed on the both sides of the occupant are both descending airflows, and it is not designed that these airflows join together to circulate around the occupant, which makes it difficult to control the directions of the airflows along the way. For this reason, also in the above modification, there is a possibility that the air is mixed easily in the seating spaces adjacent to each other in the left-right direction of the seats, so that it may sometimes be difficult to provide a space favored by each occupant in each seat.

The present disclosure provides spaces favored by respective occupants in respective seats adjacent to each other in the left-right direction of the seats in a vehicle cabin.

A first aspect of the present disclosure is a vehicle cabin airflow forming device. The airflow forming device is configured to, when the vehicle cabin airflow forming device is operated, form airflows circulating around a seating space of a seat and form, as part of the airflows, an ascending airflow on one lateral side of the seating space, and a descending airflow on the other lateral side of the seating space. The seat is provided inside a vehicle cabin, and the airflows circulate around the seating space as viewed from a front side of the seat.

According to the first aspect, during the operation of the vehicle cabin airflow forming device, there are formed airflows circulating around the seating spaces of the seats when the seats provided inside the vehicle cabin are viewed from the front side. As part of the circulating airflows, an ascending airflow is formed on one lateral side of each seating space and a descending airflow is formed on the other side of each seating space. Therefore, since the seating space is surrounded by the circulating airflow, and is partitioned by this airflow from the seating space of the adjacent seat in the left-right direction of the seats, a space favored by each occupant can be secured.

In the above first aspect, the airflow forming unit may include, in a flow path of the airflows, an airflow generating unit configured to generate airflows by sucking air in the flow path and blowing the air to the flow path.

According to the above configuration, the airflow generating unit is provided in the flow path of the circulating airflows, and the airflow generating unit sucks air in the flow path and blows out the air to the flow path, to thereby generate airflows. Accordingly, the accuracy of airflow control is enhanced.

In the above first aspect, the airflow generating unit may include a first airflow generating unit and a second airflow generating unit. The first airflow generating unit may include: an upper suction port that is provided on a vehicle ceiling side and into which air forming the ascending airflow is sucked; an upper blowing port that is provided on the vehicle ceiling side and from which air forming the descending airflow is blown out; and an upper blower configured to suck air in the vehicle cabin from the upper suction port and blow out the air from the upper blowing port into the vehicle cabin. The second airflow generating unit may include: a lower suction port provided on the vehicle floor side and air forming the descending airflow is sucked; a lower blowing port provided on one lateral side of the seating space and from which air forming the ascending airflow is blown out; and a lower blower configured to suck air in the vehicle cabin from the lower suction port and blow out the air from the lower blowing port into the vehicle cabin.

According to the above configuration, as the lower blower is operated, the air in the vehicle cabin is sucked from the lower suction port, and the air is then blown out from the lower blowing port into the vehicle cabin, to thereby form an ascending airflow on one lateral side of each seating space. In addition, as the upper blower is operated, the air forming the ascending airflow in the vehicle cabin is sucked from the upper suction port, and the air is blown into the vehicle cabin from the upper blowing port, to thereby generate the descending airflow on the other lateral side of each seating space. Then, the air forming the descending airflow is sucked from the lower suction port during the operation of the lower blower described above. As described above, the airflows are controlled with higher accuracy, and the airflows can circulate around the seating spaces.

In the above first aspect, the other lateral side may be located on a side of a closing position of a door configured to open and close a door opening for occupant ingress-egress.

According to the above configuration, the door opening for occupant ingress-egress is opened and closed by the door, and the descending airflow can be formed on the side of the door closing position with respect to the seating space; therefore, an air curtain can be formed by this descending airflow.

In the above first aspect, the vehicle cabin airflow forming device may include a detecting unit configured to detect boarding information when an occupant is about to get in the vehicle. The airflow forming device may include a wind direction changing unit and a control unit. The wind direction changing unit may be provided on the upper blowing port and configured to be switched between a first mode of directing the airflow to a direction of the descending airflow and a second mode of directing at least part of the airflow toward a get-out direction side from the direction of the descending airflow. The control unit may be configured to control the upper blower to operate and control the wind direction changing unit to be switched from the first mode to the second mode based on the boarding information detected by the detecting device.

In the above first aspect, the control unit may be configured to control the upper blower to be operated when the control unit determines a possibility that a head of the occupant hits an upper part of the door opening based on the boarding information detected by the detecting unit.

According to the above configuration, the wind direction changing unit provided to the upper suction port is configured to be switched between the first mode of directing the airflow to the direction of the descending airflow, and the second mode of directing at least part of the direction of the airflow to the get-out direction side from the direction of the descending airflow. The control unit controls the upper blower to be operated when determining a possibility that the head of the occupant may hit the upper part of the door opening based on the boarding information detected by the detecting unit, and also control the wind direction changing unit to be switched from the first mode to the second mode. Therefore, the occupant about to get in the vehicle can be made aware of the position of the upper part of the door opening for occupant ingress-egress by the airflows in the second mode.

In the above first aspect, the detecting unit may be configured to detect a distance between an upper part of the door opening and a head of the occupant, as the boarding information. When the control unit determines that the distance detected by the detecting unit is equal to or less than a predetermined value, the control unit may be configured to control the upper blower such that air power becomes larger than air power during a normal operation of the upper blower.

In the above first aspect, the control unit may be configured to determine that there is a possibility that a head of the occupant hits the upper part of the door opening when the control unit determines that the distance detected by the detecting unit is equal to or less than the predetermined value.

According to the above configuration, the distance between the upper part of the door opening and the head of the occupant is detected by the detecting unit as boarding information. When the control unit determines that the distance detected by the detecting unit is equal to or less than a predetermined value, the control unit determines a possibility that the head of the occupant may hit the upper portion of the door opening, and then controls the upper blower such that the wind power is larger than that during the normal operation of the upper blower. Accordingly, it is possible to make the occupant notice that the head of the occupant is likely to hit the upper part of the door opening.

In the above first aspect, the seat may be a single seat, and one of the ascending airflow and the descending airflow may be formed between the seat and another seat adjacent to the seat.

In the above first aspect, the upper suction port may extend in a vehicle front-rear direction.

In the above first aspect, the upper blower may be configured to suck air in the vehicle cabin from the upper suction port and blow out the air from the upper blowing port toward the lower suction port in the vehicle cabin. The lower blower may be configured to suck air in the vehicle cabin from the lower suction port and blow out the air from the lower blowing port toward the upper suction port in the vehicle cabin.

As described above, according to the first aspect of the present disclosure, it is possible to provide a space favored by each occupant for each seat adjacent to each other in the left-right direction of the seats in the vehicle cabin.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a longitudinal sectional view showing a state taken along line V-V of FIG. 4;

DETAILED DESCRIPTION OF EMBODIMENTS

First Embodiment

A vehicle cabin airflow forming device according to the first embodiment of the present disclosure will be described with reference to FIG. 1 to FIG. 6B. In these drawings, as appropriately shown, an arrow FR indicates a vehicle front side, an arrow UP indicates a vehicle upper side, an arrow W indicates a vehicle width direction, and an arrow IN indicates an inner side in the vehicle width direction.

Figure 1:
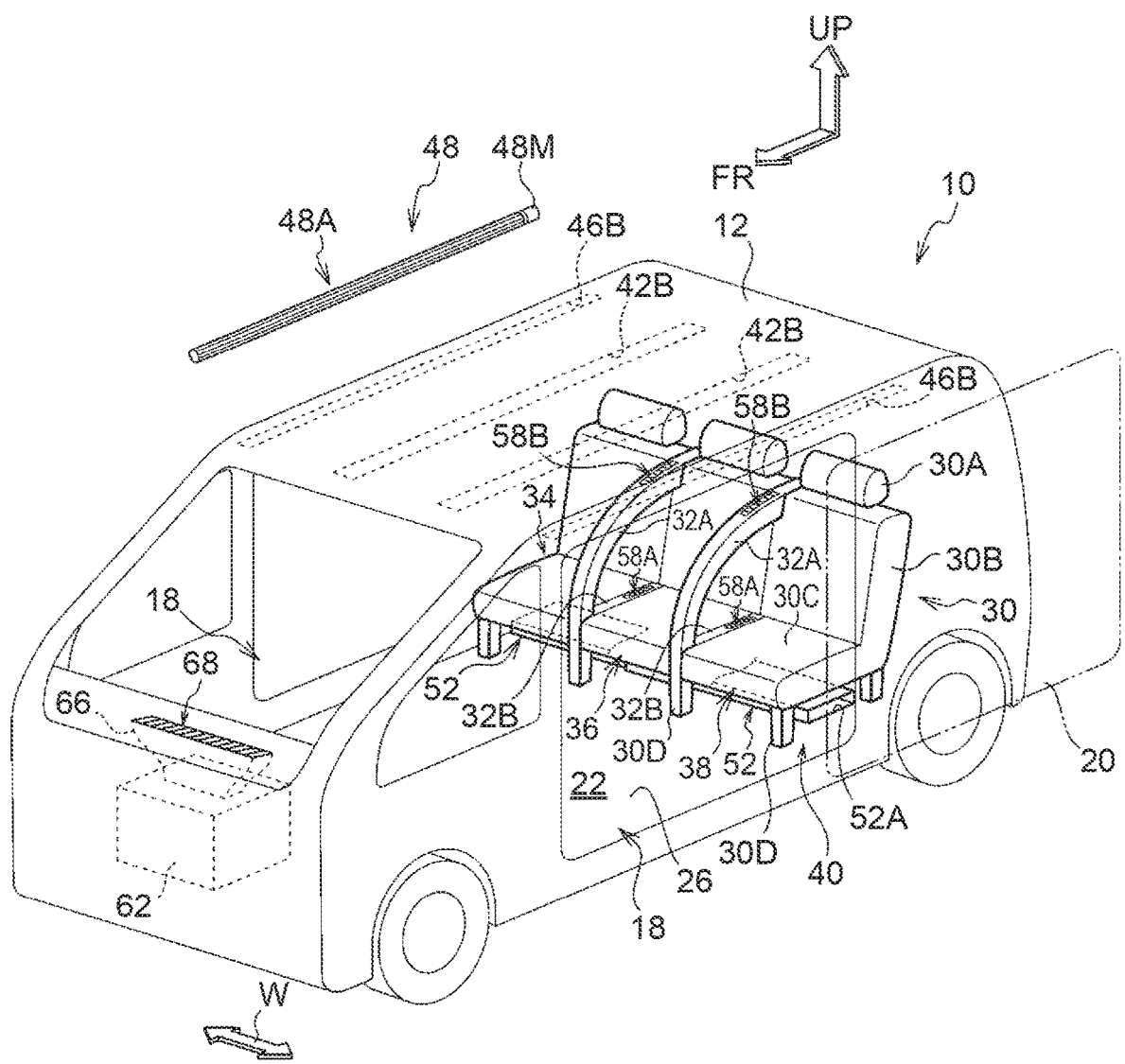
FIG. 1 is a partially exploded perspective view showing a vehicle provided with a vehicle cabin airflow forming device according to a first embodiment.
Figure 2:
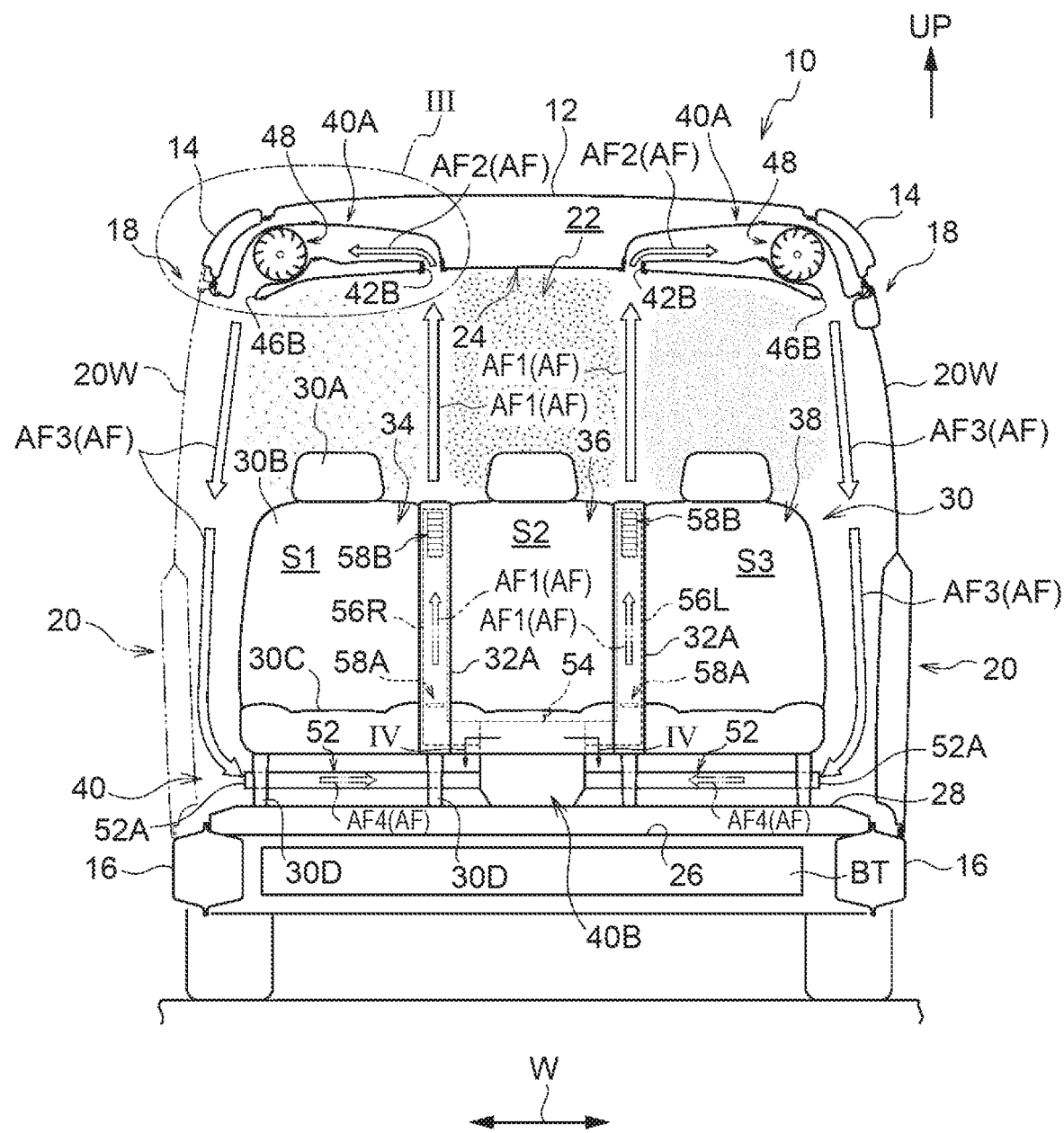
FIG. 2 is a longitudinal sectional view of the vehicle in FIG. 1 in a vehicle front view, showing a state in which the vehicle is taken along the vehicle width direction at an intermediate part of the vehicle in the vehicle longitudinal direction.

FIG. 1 is a partially exploded perspective view of a vehicle 10 provided with a vehicle cabin airflow forming device 40 according to the present embodiment. FIG. 2 is a longitudinal sectional view of the vehicle 10 in a vehicle front view, showing a state in which the vehicle is taken along the vehicle width direction at an intermediate part of the vehicle in the vehicle longitudinal direction. As shown in these drawings, the vehicle 10 includes a roof panel 12 at a top end thereof.

As shown in FIG. 2, outer ends in the vehicle width direction of the roof panel 12 are joined respectively to roof side rails 14. Each roof side rail 14 is a vehicle body frame member having a closed cross-sectional structure extending in the vehicle front-rear direction, and configures an upper edge of a side door opening 18 located on each vehicle lateral side. The side door opening 18 is a door opening for occupant ingress-egress. A lower edge of the side door opening 18 is formed by a rocker 16 that is a vehicle body frame member having a closed cross-sectional structure extending in the vehicle longitudinal direction. Further, pillars (not shown) respectively configuring a front edge and a rear edge of the side door opening 18 connect the roof side rail 14 to the rocker 16 substantially in the vehicle height direction. As shown in FIG. 1, the side door opening 18 is opened and closed by a side door 20 as a door (only an outline thereof is indicated by a two-dot chain line in FIG. 1). In the present embodiment, the side door 20 is configured as a sliding door, for example, and a window portion 20W (see FIG. 2) is formed in an upper part of the side door 20. FIG. 1 shows a state in which the side door 20 is at an opening position, and FIG. 2 shows a state in which the side door 20 is at a closing position.

As shown in FIG. 1 and FIG. 2, the vehicle 10 includes a vehicle cabin 22 serving as a boarding space for an occupant. As shown in FIG. 2, a vehicle ceiling (also referred to as a "roof headlining") 24 is disposed at an upper part of the vehicle cabin 22. The vehicle ceiling 24 is arranged on the vehicle lower side, having a space in the vehicle lower side with respect to the roof panel 12. A floor panel 26 serving as a vehicle floor is arranged at a lower part of the vehicle cabin 22, and outer ends in the vehicle width direction of the floor panel 26 are joined to the respective rockers 16. A floor cross member 28 (not shown in FIG. 1) extending along the vehicle width direction is joined to an upper surface of the floor panel 26. An illustration of a carpet on the upper surface of the floor panel 26 is omitted. A battery BT is mounted on a lower surface of the floor panel 26.

A vehicle seat 30 is arranged in the vehicle cabin 22. The vehicle seat 30 shown in FIG. 1 and FIG. 2 is a rear seat. In FIG. 1, an illustration of front seats is omitted, and the rear seat (vehicle seat 30) is illustrated with vehicle outer panels and the others illustrated in a transparent state. As shown in FIG. 1 and FIG. 2, the vehicle seat 30 includes: a seat cushion 30C; a seat back 30B supported by a rear end of the seat cushion 30C; and headrests 30A disposed at an upper end of the seat back 30B. The seat cushion 30C supports the buttock and thighs of a seated occupant, the seat back 30B supports the upper body of the seated occupant, and the headrest 30A supports the head of the seated occupant.

The seat cushion 30C is supported by the floor cross member 28 (see FIG. 2) via legs 30D. Thereby, a space is formed between the floor panel 26 and the seat cushion 30C. The vehicle seat 30 includes three seats 34, 36, 38 arranged in the vehicle width direction. As shown in FIG. 1, between the seat 34 and the seat 36 and between the seat 36 and the seat 38, there are disposed lateral partitioning members 32A connecting the upper end of the seat back 30B and a front end of the seat cushion 30C. Each lateral partitioning member 32A is configured by an arc-shaped square pipe protruding toward a front and obliquely upper side of the seat, in a side view of the seat. Further, lower partitioning members 32B extend along the seat front-rear direction respectively between the seat 34 and the seat 36 and between the seat 36 and the seat 38 at a level of the upper part of the seat cushion 30C. Note that the three seats 34, 36, 38 may be single seats respectively.

As shown in FIG. 2, the vehicle cabin airflow forming device 40 of the present embodiment mounted in the vehicle 10 is configured to form airflows AF circulating around seating spaces S1, S3 of the seats 34, 38 as viewed from the front side of the seats 34, 38, which are located on both sides and disposed inside the vehicle cabin 22, during operation of the device. The airflows AF include an ascending airflow AF1, a substantially horizontal upper airflow AF2 that flows outward in the vehicle width direction, a descending airflow AF3, and a substantially horizontal lower airflow AF4 that flows inward in the vehicle width direction. As part of the circulating airflows AF, the vehicle cabin airflow forming device 40 is configured to form the ascending airflow AF1 on one lateral side of the seating spaces S1, S3 of the seats 34, 38 (in the present embodiment, inward in the vehicle width direction), and the descending airflow AF3 on the other lateral side of the seating spaces S1, S3 (in the present embodiment, on the side of a closing position at which the side door 20 is closed). Hereinafter, the vehicle cabin airflow forming device 40 will be described in detail.

The vehicle cabin airflow forming device 40 includes first airflow generating units 40A and a second airflow generating unit 40B that serve as an airflow generating unit provided in a flow path of the circulating airflows AF. The first airflow generating units 40A and the second airflow generating unit 40B are components that generate airflows by sucking air in the flow path of the circulating airflows AF and blowing the air to the flow path. The vehicle cabin airflow forming device 40 forms the ascending airflow AF1 and the descending airflow AF3 during the operation of the first airflow generating units 40A and the second airflow generating unit 40B.

Figure 3:
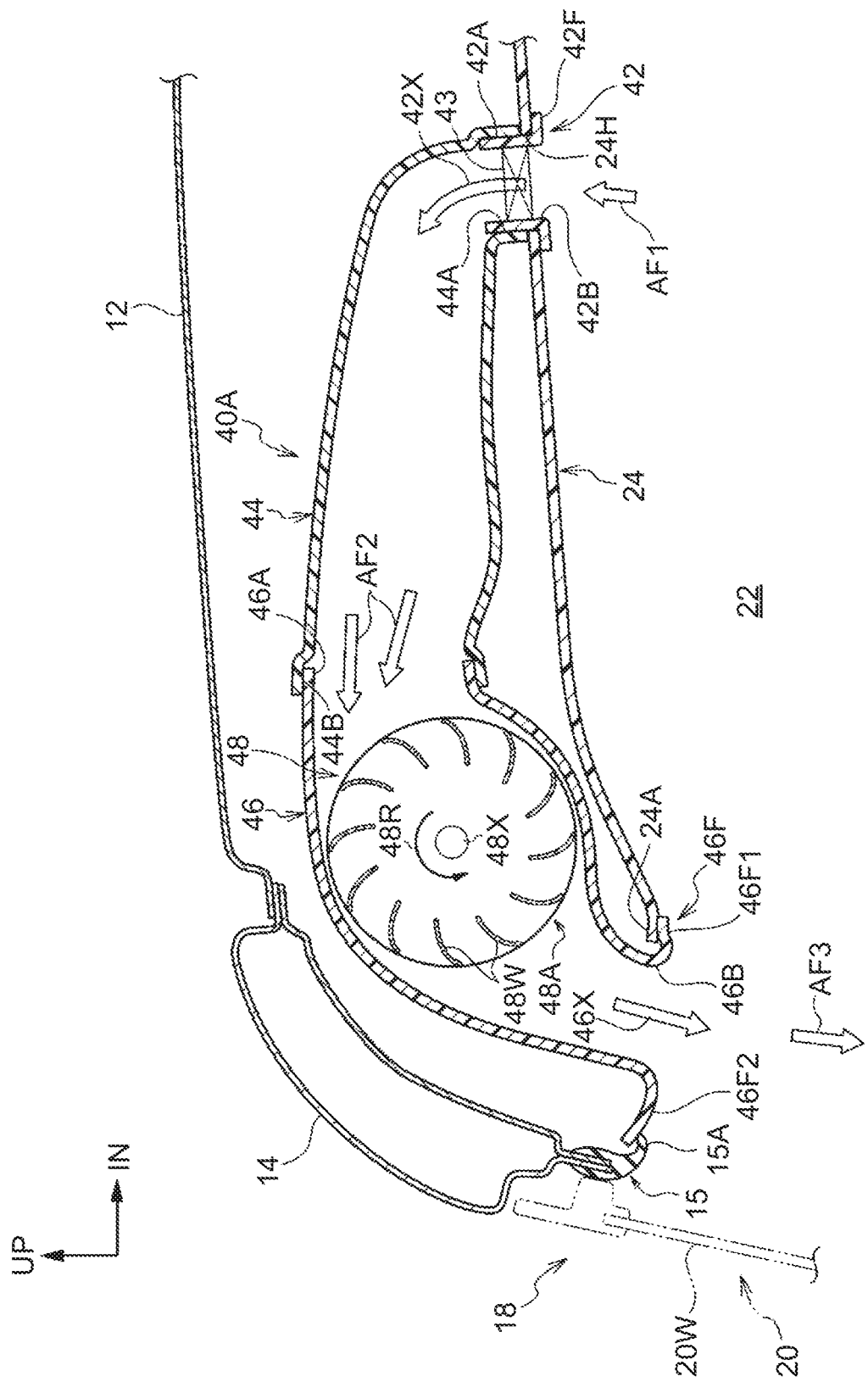
FIG. 3 is a partially enlarged view showing a part III in FIG. 2 in an enlarged manner.

The first airflow generating units 40A are arranged at an upper part of the vehicle, and provided in pair on the right and left between the vehicle ceiling 24 and the roof panel 12. FIG. 3 shows a partially enlarged view in which a part III (a part including the first airflow generating unit 40A) of FIG. 2 is enlarged. The configuration on the vehicle left side (the right side in FIG. 2) of the upper part of the vehicle is basically symmetrical with the configuration shown in FIG. 3; therefore, detailed description thereof will be omitted.

As shown in FIG. 3, the first airflow generating units 40A each include a flanged short pipe 42. The flanged short pipe 42 is disposed at a position including a portion located immediately above the lateral partitioning member 32A (see FIG. 2). The flanged short pipe 42 includes a pipe body 42A that penetrates in the vehicle height direction and extends in the vehicle front-rear direction, and a flange portion 42F that integrally extends outward from a lower end of the pipe body 42A. The pipe body 42A of the flanged short pipe 42 is inserted into a through-hole 24H of the vehicle ceiling 24 from below, and an upper surface of the flange portion 42F of the flanged short pipe 42 is joined around a periphery of the through-hole 24H of the vehicle ceiling 24. Further, a filter 43 (not shown in FIG. 2) is arranged inside the pipe body 42A of the flanged short pipe 42. The filter 43 adsorbs and removes odorous components in the air, and collects and removes dust in the air. A lower end opening of the flanged short pipe 42 configures an upper suction port 42B that is disposed on the vehicle ceiling 24 side in the first airflow generating unit 40A so as to suck the air forming the ascending airflow AF1. As shown in FIG. 1, the upper suction port 42B extends in the vehicle front-rear direction.

As shown in FIG. 3, the first airflow generating unit 40A includes: a crossflow fan 48 serving as an upper blower on the vehicle upper side of an outer portion in the vehicle width direction of the vehicle ceiling 24; and a fan case 46 accommodating the crossflow fan 48. The fan case 46 covers an outer periphery of the crossflow fan 48, and a suction port 46A is connected to the flanged short pipe 42 via a duct 44. The duct 44 and the fan case 46 extend in the vehicle front-rear direction in such a manner as to correspond to the flanged short pipe 42. Although not illustrated in the drawing, the duct 44 and the fan case 46 are formed with reinforcing portions such as reinforcing beads. An opening end 44A located on the inner side in the vehicle width direction of the duct 44 is joined to an outer peripheral surface of the pipe body 42A of the flanged short pipe 42, and an opening end 44B located on the outer side in the vehicle width direction of the duct 44 is joined to an outer peripheral surface of the suction port 46A located on the inner side in the vehicle width direction of the fan case 46.

In addition, an outer portion in the vehicle width direction of the fan case 46 is inclined toward the vehicle lower side and toward the outer side in the vehicle width direction. A flange portion 46F extending outward from an opening portion of the fan case 46 is formed at an outer end in the vehicle width direction of the fan case 46. The flange portion 46F has a portion 46F1 extending inward in the vehicle width direction and joined to a lower surface of an outer end 24A of the vehicle ceiling 24 in the vehicle width direction, and also has a portion 46F2 extending outward in the vehicle width direction with which a fin portion 15A of an opening trim 15 fitted to a lower end of the roof side rail 14 elastically contact. Further, the opening located on the outer side in the vehicle width direction of the fan case 46 faces vehicle-downward, and configures an upper blowing port 46B that is disposed on the vehicle ceiling 24 side in the first airflow generating unit 40A so as to blow out the air forming the descending airflow AF3. In the drawing, the direction of air blowing from the upper blowing port 46B is indicated by an arrow 46X. In addition, a filter may be provided inside the upper blowing port 46B.

As shown in FIG. 1, the upper blowing port 46B extends in the vehicle front-rear direction. The formation range of the upper blowing port 46B in the vehicle front-rear direction includes the range of the side door opening 18 in the vehicle front-rear direction, and is substantially equal to the formation range of the upper suction port 42B in the vehicle front-rear direction.

The crossflow fan 48 accommodated in the fan case 46 shown in FIG. 3 is arranged such that its axial direction extends in the vehicle front-rear direction, and the crossflow fan 48 includes: an impeller 48A provided with a large number of blades 48W about a rotation shaft 48X, and a motor 48M (see FIG. 1) rotationally driving the impeller 48A. In the drawing, the rotating direction of the impeller 48A is indicated by an arrow 48R. The impeller 48A shown in a removed state in FIG. 1 is extended in the vehicle front-rear direction, and the motor 48M is provided on the rear end side of the impeller 48A in the vehicle front-rear direction. The crossflow fan 48 shown in FIG. 3 is operated to suck the air in the vehicle cabin 22 from the upper suction port 42B (see an arrow 42X) and to blow out the air from the upper blowing port 46B into the vehicle cabin 22 (see an arrow 46X). Note that the crossflow fan 48 may be configured to suck air in the vehicle cabin 22 from the upper suction port 42B and blow out the air from the upper blowing port 46B into the lower suction port 52A in the vehicle cabin 22.

On the other hand, the second airflow generating unit 40B shown in FIG. 2 is disposed to the lower part of the vehicle cabin 22. As shown in FIG. 1 and FIG. 2, the second airflow generating unit 40B includes a duct 52 disposed under the seat cushion 30C. The duct 52 is extended in the seat width direction, and has a cross-sectional shape taken along the seat front-rear direction that is formed in a substantially rectangular shape elongated in the seat front-rear direction. Each outer opening end in the vehicle width direction of the duct 52 shown in FIG. 2 faces outward in the vehicle width direction, and is provided on the floor panel 26 side to configure the lower suction port 52A (see FIG. 1) for sucking the air forming the descending airflow AF3 in the second airflow generating unit 40B.

Figure 4:
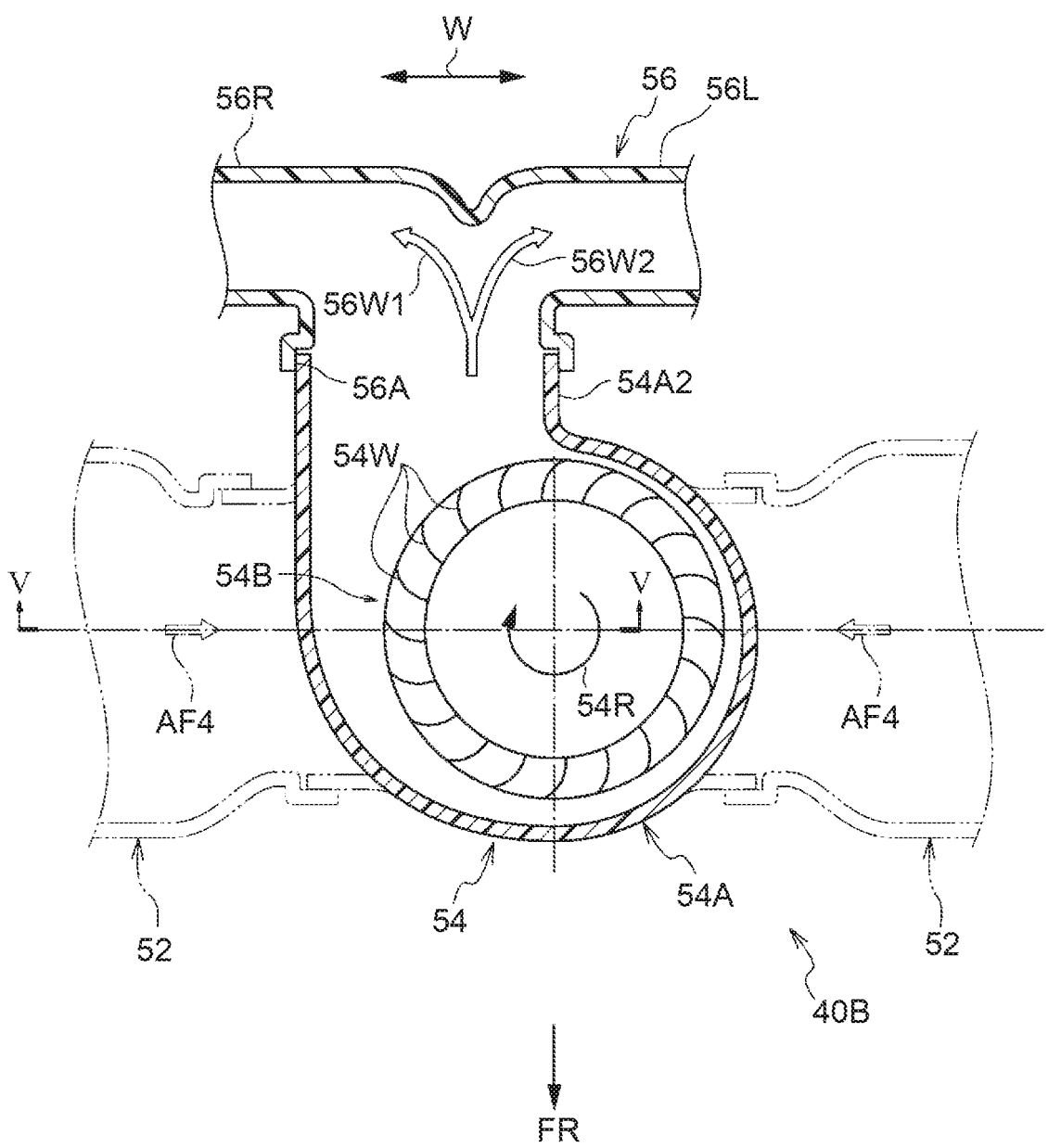
FIG. 4 is an enlarged plan sectional view showing a state in which a part of a second airflow generating unit of FIG. 2 is taken along line IV-IV in an enlarged manner.

FIG. 4 shows an enlarged plan sectional view of a state in which a part of the second airflow generating unit 40B shown in FIG. 2 is taken along IV-IV line in an enlarged manner. Further, FIG. 5 shows a longitudinal sectional view taken along line V-V of FIG. 4. As shown in FIG. 5, a filter 53 is disposed on the lower suction port 52A side in the duct 52. The filter 53 adsorbs and removes odorous components in the air and collects and removes dust in the air. An opening cylindrical portion 54A1 located at a lower position of a side wall of a case 54A of a sirocco fan 54 serving as a lower blower is connected to an opening end 52B on the inner side in the vehicle width direction of the duct 52. The sirocco fan 54 is set at a position in the vehicle width direction corresponding to the middle seat 36 shown in FIG. 2.

As shown in FIG. 5, the sirocco fan 54 includes: an impeller 54B accommodated in an upper space in the case 54A; and a motor 54M rotationally driving the impeller 54B. The impeller 54B is rotatable about an axis 54X extending in the vehicle height direction and formed in a cylindrical shape, and is provided with a large number of blades 54W arranged at intervals in the circumferential direction. In FIG. 4, the rotating direction of the impeller 54B is indicated by an arrow 54R. In addition, as shown in FIG. 5, the motor 54M is fixed on an upper surface of the case 54A.

Figure 6A:
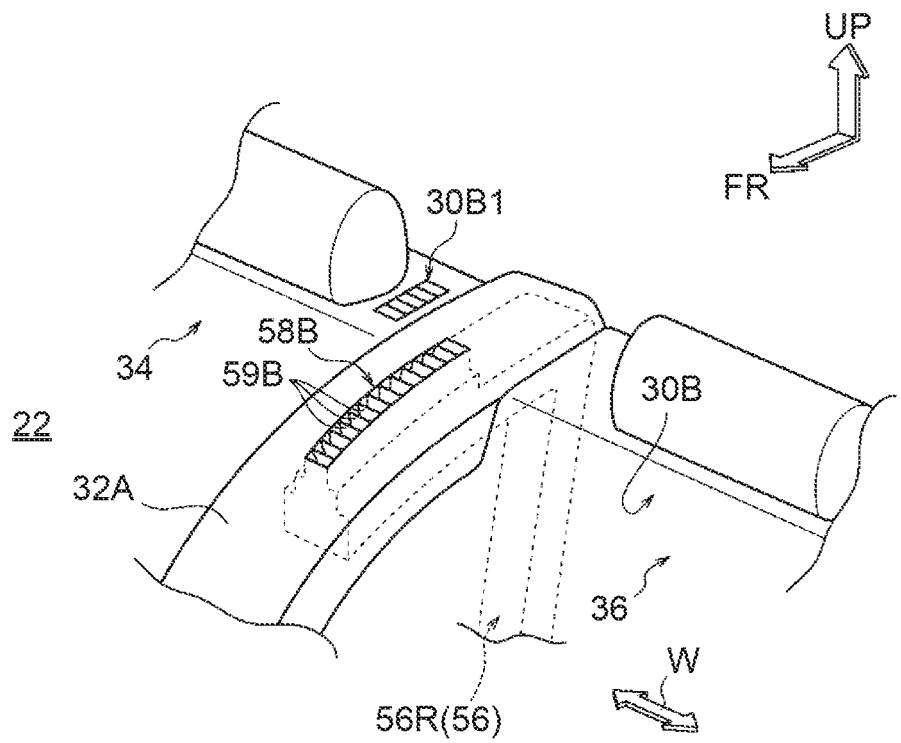
FIG. 6A is an enlarged perspective view showing an upper part of a lateral partitioning member provided between seating spaces, and a peripheral part thereof in an enlarged manner.

An exhaust duct portion 54A2 extending toward the vehicle rear side is formed at an upper position of the case 54A shown in FIG. 4. A filter may be provided inside the exhaust duct portion 54A2. A base end opening portion 56A of a two-pronged duct 56 is connected to the exhaust duct portion 54A2. Of the two-pronged duct 56, a right duct portion 56R disposed on the vehicle-right side (the left side in the drawing) extends outward in the vehicle width direction from the base end, and is bent vehicle rearward below the first lower blowing port 58A shown in FIG. 6B. The first lower blowing port 58A is formed in the lower partitioning member 32B located immediately below the lateral partitioning member 32A (see FIG. 6A), and is connected to the right duct portion 56R. The right duct portion 56R extends vehicle-rearward from a position below the first lower blowing port 58A to the inside of the seat back 30B, is bent toward the upper side of the seat back inside the seat back 30B, and extends to the upper end of the seat back 30B as shown in FIG. 6A. Further, the right duct portion 56R extends from the upper end of the seat back 30B to an inner upper portion of the lateral partitioning member 32A. A second lower blowing port 58B connected to the right duct portion 56R is formed in an upper wall portion located at an upper position of each lateral partitioning member 32A.

Also, the left duct portion 56L disposed on the vehicle-left side (the right side in the drawing) of the duct 56 shown in FIG. 4 is basically symmetrical with the right duct portion 56R, and extends between the seat 36 and the seat 38 shown in FIG. 2. In FIG. 4, the directions of the airflows divided into the right duct portion 56R and the left duct portion 56L are indicated by arrows 56W1, 56W2, respectively.

Figure 6B:
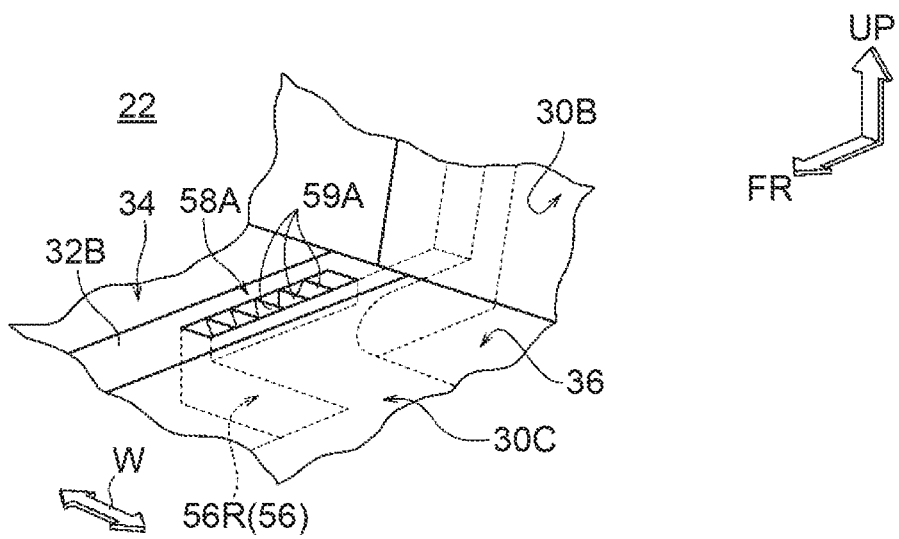
FIG. 6B is an enlarged perspective view showing a rear part of a lower partitioning member provided between the seating spaces and a peripheral part thereof in an enlarged manner.

The first lower blowing port 58A and the second lower blowing port 58B shown in FIG. 2 are provided on lateral sides (the inner sides in the vehicle width direction in the present embodiment) of the respective seating spaces S1, S3, and are configured as blowing ports that blow out the air forming the ascending airflow AF1. Further, the sirocco fan 54 shown in FIG. 5 is provided to be operated to suck the air in the vehicle cabin 22 from the lower suction ports 52A and blow out the air into the vehicle cabin 22 from the first air blowing ports 58A and the second lower blowing ports 58B shown in FIG. 1, etc. Note that the sirocco fan 54 may be configured to suck air in the vehicle cabin 22 from the lower suction port 52A and blow out the air from the lower blowing port 58A, 58B into the upper suction port 42B in the vehicle cabin 22. The orientation of a plurality of fins 59B provided in each second lower blowing port 58B shown in FIG. 6A is set such that the air blown out from the second lower blowing port 58B flows toward the vehicle upper side while being diffused in the vehicle front-rear direction. Similarly, the orientation of a plurality of fins 59A provided in the first lower blowing port 58A shown in FIG. 6B is set such that the air blown from the first lower blowing port 58A flows toward the vehicle upper side while being diffused in the vehicle front-rear direction.

Further, as shown in FIG. 6A, a scent blowing port 3081 (not shown in FIG. 1) is formed to the upper end of each seat back 30B. A desired scent can be blown out from the scent blowing port 30B 1 by a scent generating device (not shown) having a known configuration.

As shown in FIG. 1, an air conditioner main body 62 is arranged in the front part of the vehicle 10. The air conditioner main body 62 is operated by electric power supplied from a battery (not shown), and can supply temperature-adjusted air. A duct 66 is connected immediately above the air conditioner main body 62, and an in-vehicle cabin blowing port 68 is provided to a front end of the duct 66. The in-vehicle cabin blowing port 68 is disposed to the front part of the vehicle cabin 22. That is, the air whose temperature is adjusted by the air conditioner main body 62 is blown out from the in-vehicle cabin blowing port 68 into the vehicle cabin 22 via the duct 66. In the present embodiment, the seats 34, 36, 38 are provided with the respective air blowing ports (not shown) facing the seating spaces S1, S2, S3 (see FIG. 2), respectively, and these air blowing ports are set at a front end of a duct (not shown) connected to the air conditioner main body 62. Accordingly, it is possible to blow out the temperature-adjusted air from the air blowing ports.

Operation and Effects

Next, operation and effects of the present embodiment will be explained.

In the present embodiment, during the operation of the vehicle cabin airflow forming device 40 shown in FIG. 2, there are formed the airflows AF circulating around the seating spaces S1, S3 of the seats 34, 38 on both sides in the vehicle cabin 22 as viewed from the front view of the seats 34, 38. As part of the above circulating airflows AF, the ascending airflow AF1 is formed on one lateral side of each of the seating spaces S1, S3 (located on the inner side of the vehicle width direction in the present embodiment), and the descending airflow AF3 is formed on the other lateral side of each of the seating spaces S1, S3 (on the side of the closing position of each side door 20 in the present embodiment).

Therefore, the seating spaces S1, S3 are surrounded by the circulating airflows AF, and are separated from the seating space S2 of the adjacent seat 36 in the left-right direction of the seats by the ascending airflow AF1. Therefore, even when occupants are seated in the respective seats 34, 36, 38, a comfortable space desired by each occupant can be secured. Supplementally, for example, by providing a scent generating device for each of the seats 34, 36, 38, it is possible to secure spaces having scents suitable to respective occupants' preferences for the respective seats 34, 36, 38. For example, by providing each of the seats 34, 36, 38 with a temperature adjusting device (for example, a heater, etc.), a room temperature space suitable to each occupant's preference can be secured for each of the seats 34, 36, 38. In FIG. 2, in order to schematically show a state in which respective spaces desired by the occupants are formed for the respective seats 34, 36, 38, different dot patterns are used in the upper regions of the respective seats 34, 36, 38.

In the present embodiment, the first airflow generating unit 40A and the second airflow generating unit 40B are provided in the flow path of the circulating airflows AF, and the first airflow generating unit 40A and the second airflow generating unit 40B suck the air in the flow path and blow out this air into the flow path, to thereby generate airflows. Accordingly, the accuracy of airflow control is enhanced.

More specifically describing, as the sirocco fan 54 (see FIG. 5, etc.) of the second airflow generating unit 40B is operated, the air in the vehicle cabin 22 is sucked from the lower suction ports 52A, and this air then becomes the substantially horizontal lower airflow AF4. Then, this air is blown from the first lower blowing ports 58A and the second lower blowing ports 58B into the vehicle cabin 22. As a result, the ascending airflow AF1 directed toward the vehicle-upper side is formed on one lateral side of each of the seating spaces S1, S3 (on the inner side in the vehicle width direction in the present embodiment). As the crossflow fan 48 of the first airflow generating unit 40A is operated, the air forming the ascending airflow AF1 in the vehicle cabin 22 is sucked from the upper suction ports 42B, and this air then becomes the substantially horizontal upper airflow AF2. Then, the air is increased in speed and blown out from the upper blowing ports 46B (more specifically, along the upper part of the side door 20) into the vehicle cabin 22. As a result, the descending airflow AF3 directed toward the vehicle-lower side is formed on the other lateral side of each of the seating spaces S1, S3 (on the side of the closing position of the side door 20, in the present embodiment). The air forming the descending airflow AF3 is sucked from the lower suction port 52A during the operation of the above-described sirocco fan 54 (see FIG. 5, etc.). As described above, the airflows are controlled with a further higher accuracy, and the airflows AF circulate around the seating spaces S1, S3.

As described above, according to the vehicle cabin airflow forming device 40 of the present embodiment, it is possible to provide a space desired by each occupant for each of the seats 34, 36, 38 that are adjacent to each other in the left-right direction of the seats in the vehicle cabin 22.

In the present embodiment, the side door opening 18 for occupant ingress-egress is opened and closed by the side door 20, and the descending airflow AF3 directed toward the vehicle lower side can be formed on the side of the closing position of the side door 20 with respect to the seating spaces S1, S3. Accordingly, an air curtain can be formed by the descending airflow AF3.

Second Embodiment

Figure 7:
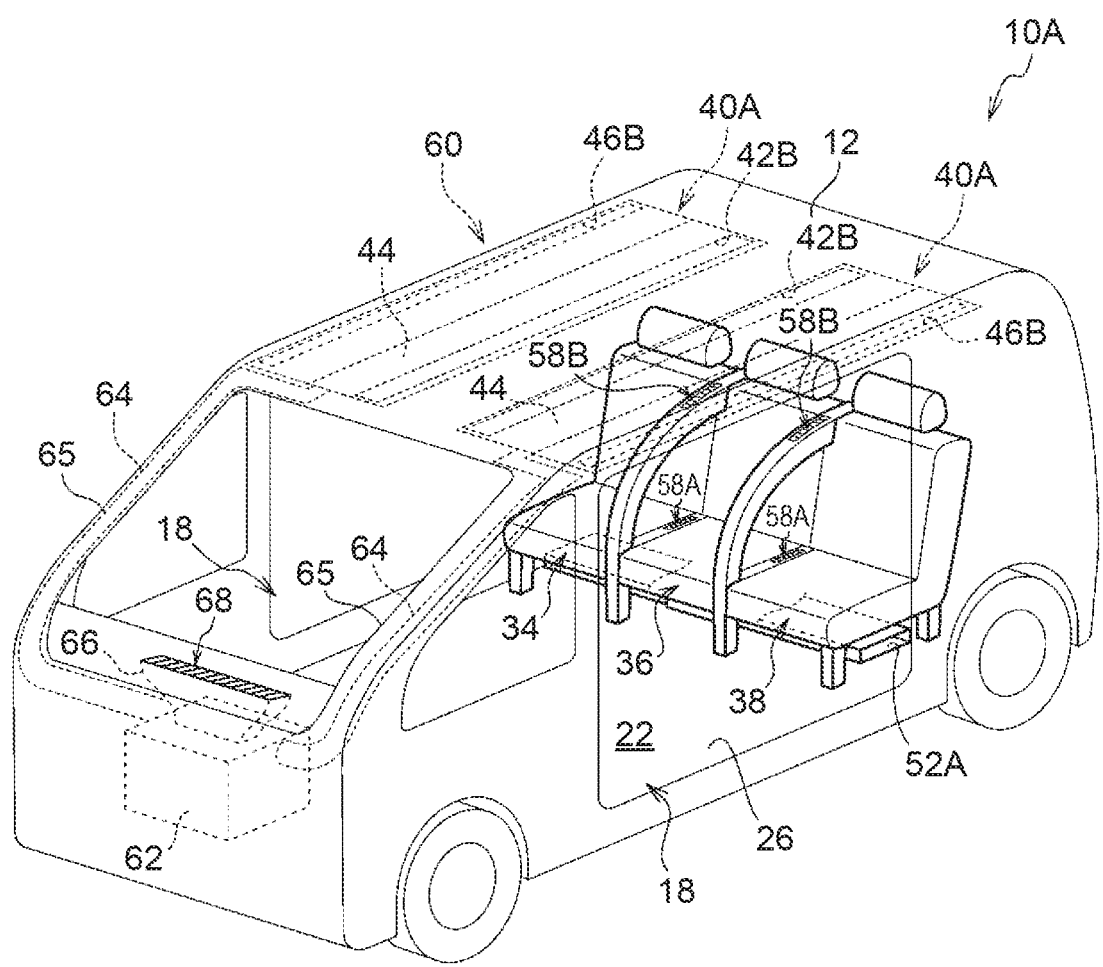
FIG. 7 is a perspective view showing the vehicle provided with a vehicle cabin airflow forming device according to a second embodiment.

Next, a vehicle cabin airflow forming device according to the second embodiment of the present disclosure will be described with reference to FIG. 7. FIG. 7 shows a perspective view of a vehicle 10A provided with a vehicle cabin airflow forming device 60 according to the second embodiment. In addition, for the convenience of the drawing, FIG. 7 shows a first airflow generating unit 40A in a simple manner. As shown in FIG. 7, the vehicle cabin airflow forming device 60 according to the present embodiment is different from the vehicle cabin airflow forming device 40 according to the first embodiment (see FIG. 2) in that the air conditioner main body 62 for adjusting the temperature in the vehicle cabin 22 is connected to the first airflow generating unit 40A by ducts 64. The other configurations are substantially the same as those of the first embodiment. Therefore, components that are substantially the same as those of the first embodiment will be denoted by the same reference numerals and description thereof will be omitted.

The ducts 64 are connected to upper portions on both sides of the air conditioner main body 62. The ducts 64 extend outward in the vehicle width direction, are bent on the lateral sides of the vehicle, and extend to an upper and obliquely rear side of the vehicle along the front pillars 65, and rear ends thereof are connected to front ends of the ducts 44 of the first airflow generating unit 40A. As a result, the air whose temperature is adjusted by the air conditioner main body 62 is blown out from the upper blowing ports 46B via the ducts 64 and the like, into the vehicle cabin 22.

With such a configuration, substantially the same operation and effects as those of the above-described first embodiment can be obtained.

Third Embodiment

Figure 8:
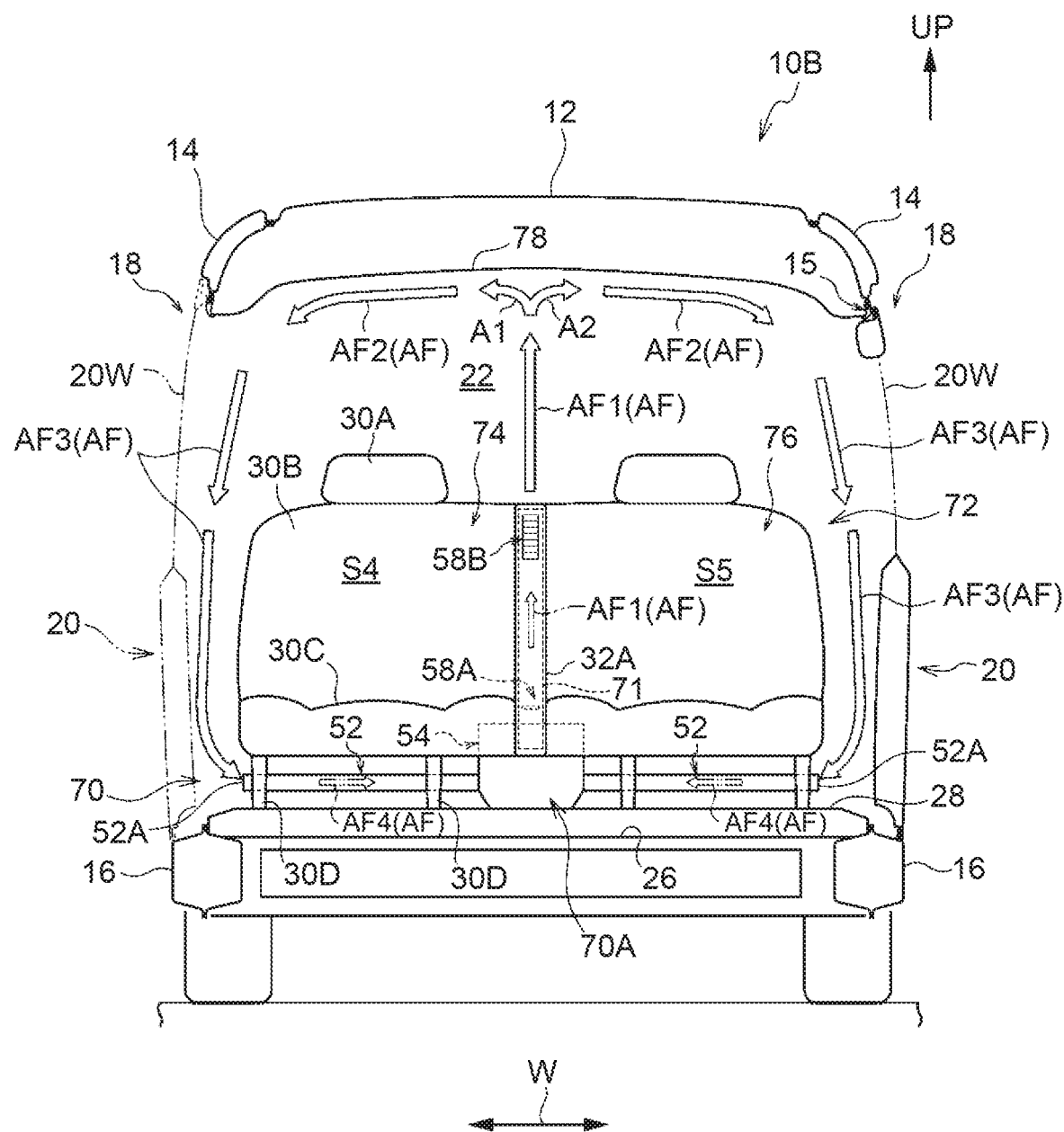
FIG. 8 is a longitudinal sectional view of the vehicle provided with a vehicle cabin airflow forming device according to a third embodiment in a vehicle front view, showing a state in which the vehicle is taken along the vehicle width direction at an intermediate part of the vehicle in the vehicle longitudinal direction.

Next, a vehicle cabin airflow forming device according to the third embodiment of the present disclosure will be described with reference to FIG. 8 while also making reference to FIG. 4 to FIG. 6B. FIG. 8 is a longitudinal sectional view of a vehicle 10B provided with a vehicle cabin airflow forming device 70 according to the third embodiment, showing a state in which the vehicle is taken along the vehicle width direction at an intermediate portion in the vehicle front-rear direction. As shown in FIG. 8, the vehicle cabin airflow forming device of the present embodiment is different from the vehicle cabin airflow forming device 40 (see FIG. 2) of the first embodiment in that: a vehicle seat 72 is provided instead of the vehicle seat 30 (see FIG. 2); there is no first airflow generating unit 40A (see FIG. 2); a vehicle ceiling 78 is arranged, instead of the vehicle ceiling 24 (see FIG. 2); an airflow generating unit 70A is provided, instead of the second airflow generating unit 40B (see FIG. 2). The other configurations are substantially the same as those of the first embodiment. Therefore, components that are substantially the same as those of the first embodiment will be denoted by the same reference numerals and description thereof will be omitted.

The vehicle seat 72 includes two seats 74, 76 arranged in the vehicle width direction. As with the first embodiment, a lateral partitioning member 32A that connects the upper end of the seat back 30B and the front end of the seat cushion 30C is disposed between the seat 74 and the seat 76. Further, a member (not shown) similar to the lower partitioning member 32B of the first embodiment extends between the seat 74 and the seat 76 along the seat front-rear direction at a level of the upper part of the seat cushion 30C. Note that the two seats 74, 76 may be single seats respectively.

The vehicle ceiling 78 is arranged on the vehicle lower side, having a space with respect to the roof panel 12. The through-hole 24H shown in FIG. 3 of the first embodiment is not formed in the vehicle ceiling 78. The vehicle ceiling 78 shown in FIG. 8 is formed in a curved shape such that outer portions in the vehicle width direction of the vehicle ceiling 78 gradually extend downward toward the lower and outer side in the vehicle width direction.

The airflow generating unit 70A has the same configuration as that of the second airflow generating unit 40B (see FIG. 2) of the first embodiment except that the airflow generating unit 70A is provided with a duct 71 that is not two-pronged shown in FIG. 8, instead of the duct 56 that is two-pronged shown in FIG. 4. The duct 71 is disposed between the seat 74 and the seat 76, extends from a connecting part of the duct 71 with the sirocco fan 54 to the inside of the seat back 30B on the rear side of the vehicle, and is bent toward the upper side of the seat back inside the seat back 30B. The duct 71 extends to the upper end of the seat back 30B, and further extends from the upper end of the seat back 30B to an inner upper portion of the lateral partitioning member 32A. The duct 71 is connected to the first lower blowing port 58A and the second lower blowing port 58B, and air having flowed through the duct 71 is blown into the vehicle cabin 22 from the first lower blowing port 58A and the second lower blowing port 58B.

Next, operation and effects of the present embodiment will be described.

In the present embodiment, as the sirocco fan 54 (see FIG. 4 and FIG. 5) of the airflow generating unit 70A is operated, the air in the vehicle cabin 22 is sucked from the lower suction ports 52A, and the air is then blown into the vehicle cabin 22 from the first lower blowing port 58A and the second lower blowing port 58B. As a result, the ascending airflow AF1 directed to the vehicle-upper side is formed on one lateral side (the inner side in the vehicle width direction in the present embodiment) of each of the seating space S4 of the seat 74 and the seating space S5 of the seat 76. This ascending airflow AF1 is substantially evenly divided in the vehicle width direction when this airflow collides against the vehicle ceiling 78 (see arrows A1, A2), and after flowing outward in the vehicle width direction along the vehicle ceiling 78 (see arrow AF2), the airflow flows vehicle-downward along the inner lateral surfaces of the vehicle cabin 22 (see arrows AF3), and is sucked from the lower suction ports 52A. That is, the descending airflow AF3 directed toward the vehicle-lower side is formed on the other lateral sides (on the sides of the closing positions of the side doors 20, in the present embodiment) of the seating spaces S4, S5.

As aforementioned, in the present embodiment, during the operation of the vehicle cabin airflow forming device 70, there are formed the airflows AF that circulate around the seating spaces S4, S5 of the seats 74, 76 provided in the vehicle cabin 22 as viewed from the front side thereof. Then, as part of the circulating airflows AF, the ascending airflow AF1 is formed on one lateral side of each of the seating spaces S4, S5 (on the inner side in the vehicle width direction in the present embodiment), and the descending airflow AF3 is formed on the other lateral side of each of the seating space S4, S5 (on the side of the closing position of the side door 20 in the present embodiment). Therefore, the seating space S4 and the seating space S5 are surrounded by the circulating airflows AF, and are partitioned by the ascending airflow AF1, and whereby a space desired by each occupant can be secured.

In the present embodiment, the airflow generating unit 70A is disposed in the flow path of the circulating airflows AF, and the airflow generating unit 70A sucks the air in the flow path and blows out the air to the flow path to generate the airflows. Accordingly, the accuracy of airflow control is enhanced.

As described above, according to the vehicle cabin airflow forming device 70 of the present embodiment, it is possible to provide a space desired by each occupant for each of the seats 74, 76 that are adjacent to each other in the left-right direction of the seats in the vehicle cabin 22.

Fourth Embodiment

Figure 9:
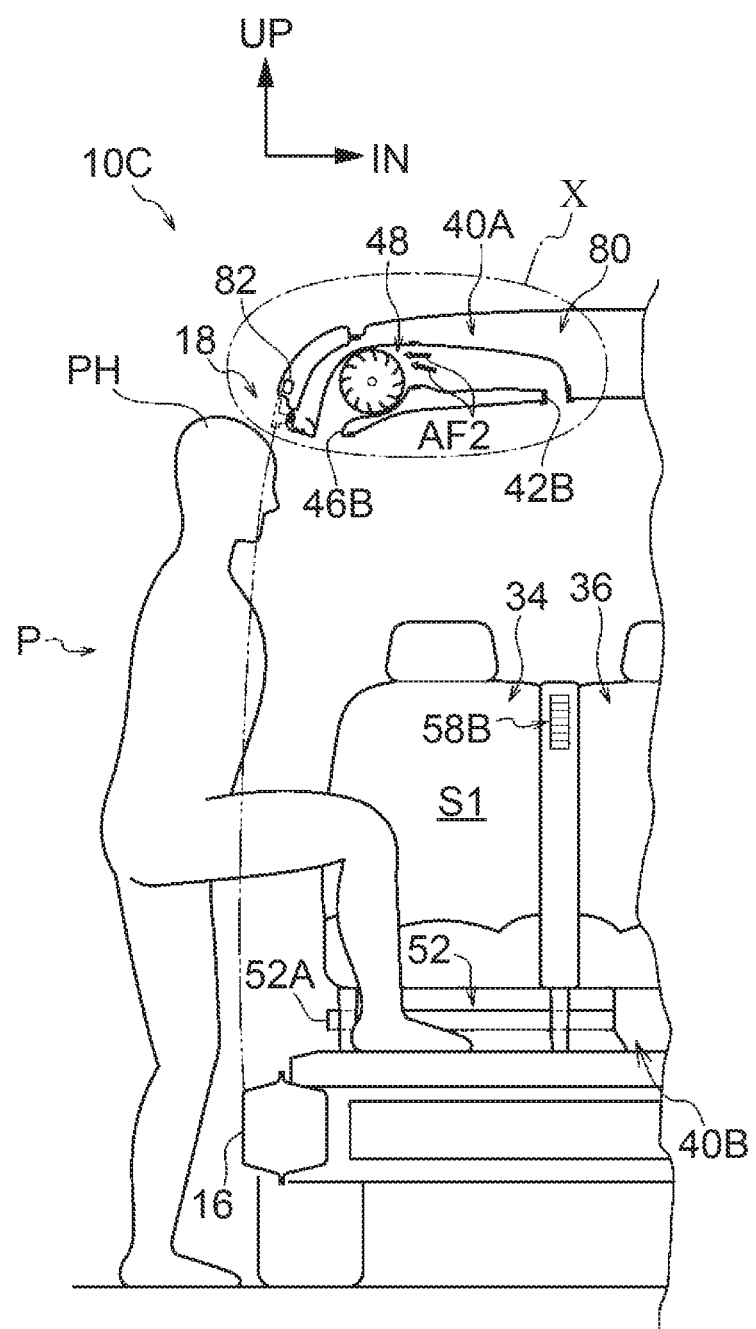
FIG. 9 is a longitudinal sectional view of the vehicle in a vehicle front view for explaining operation of the vehicle provided with a vehicle cabin airflow forming device according to a fourth embodiment.
Figure 10:
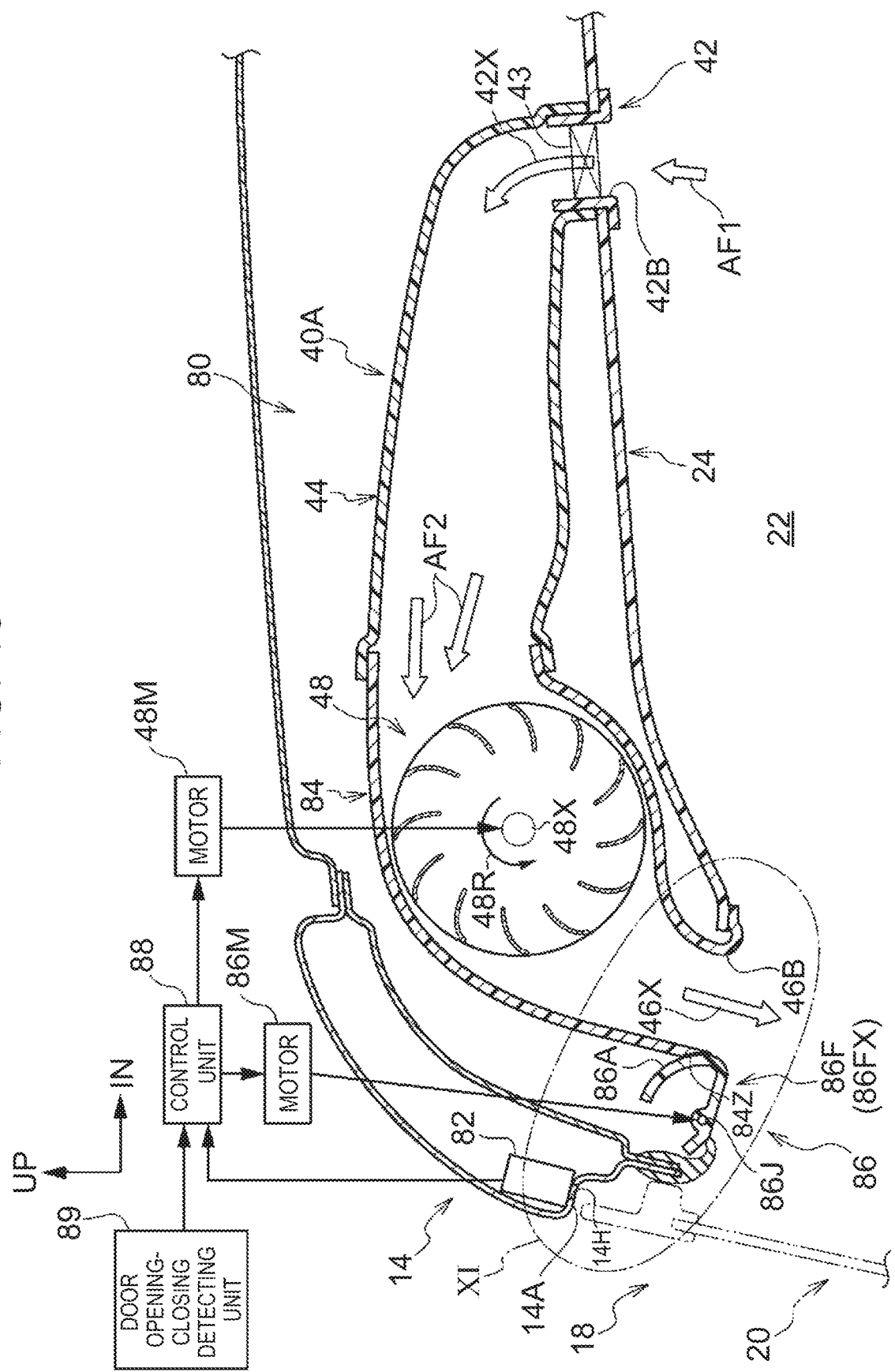
FIG. 10 is a partially enlarged view showing a part X of FIG. 9 in an enlarged manner.
Figure 11:
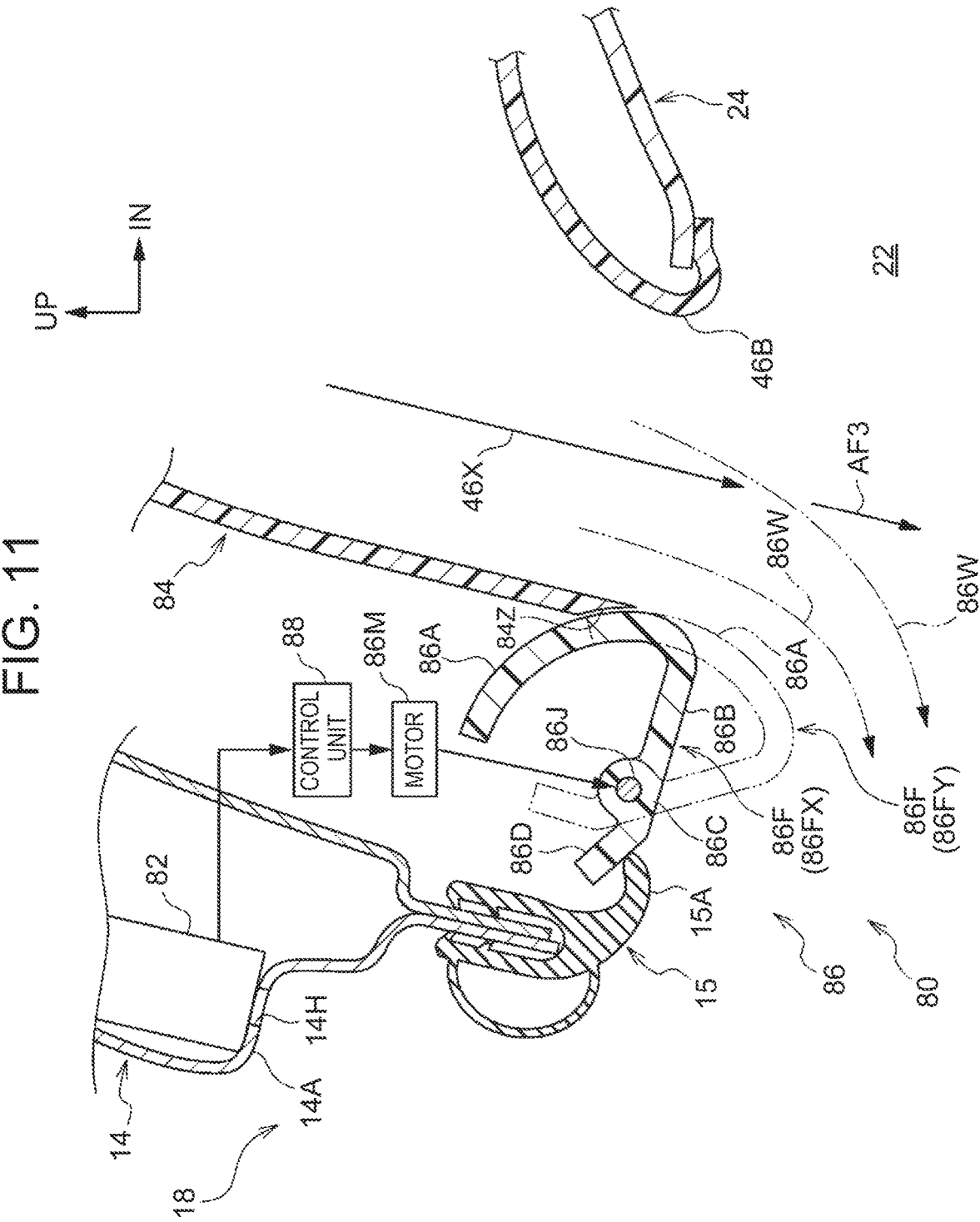
FIG. 11 is a partially enlarged view showing a state, with two-dot chain lines, in which a part XI of FIG. 10 is enlarged and a movable fin is at an operating position.

Next, a vehicle cabin airflow forming device according to the fourth embodiment of the present disclosure will be described with reference to FIG. 9 to FIG. 11. FIG. 9 shows a longitudinal sectional view of a vehicle 10C in a vehicle front view for explaining operation of the vehicle 10C provided with a vehicle cabin airflow forming device 80 according to the fourth embodiment. Further, FIG. 10 is a partially enlarged view showing a part X of FIG. 9 in an enlarged manner, and FIG. 11 is a partially enlarged view showing a part XI of FIG. 10 in an enlarged manner. The configuration of the present embodiment is substantially the same as that of the first embodiment except for the following points. Therefore, components that are substantially the same as those of the first embodiment will be denoted by the same reference numerals and description thereof will be omitted.

As shown in FIG. 10, a detecting device 82 as a detecting unit is mounted on an inner lower portion of the roof side rail 14. In the roof side rail 14, a lower wall portion 14A that supports the detecting device 82 is formed with an opening 14H penetrating the lower wall portion 14A so as to allow a light receiving section of the detecting device 82 to face the inner side of the side door opening 18. The detecting device 82 is configured to include a camera, and detect boarding information when an occupant P shown in FIG. 9 is about to get in the vehicle 10C. More specifically, the detecting device 82 detects a distance between the upper part of the side door opening 18 and a head PH of the occupant P from an image captured by the camera as boarding information. As shown in FIG. 10, the detecting device 82 is connected to a control unit 88 (illustrated in a block view in the drawing) and outputs a signal in accordance with the detection to the control unit 88.

In the meantime, the fan case 84 is configured to be the same as the fan case 46 (see FIG. 3) in the first embodiment except that no flange portion is formed at an outer end 84Z in the vehicle width direction at a position in the vehicle front-rear direction corresponding to a position where the occupant gets in the vehicle. A movable fin 86F is arranged to be adjacent to the outer end 84Z in the vehicle width direction of the fan case 84. That is, the movable fin 86F is provided at the upper blowing port 46B. The movable fin 86F is located at a position in the vehicle front-rear direction corresponding to a position where the occupant gets in the vehicle. As shown in FIG. 11, hinge pins 86J arranged along the vehicle front-rear direction are fixed to a base end 86C of the movable fin 86F. The hinge pins 86J are rotatably attached to the portions of the fan case 84 located outward in the vehicle width direction (portions on the front side and the rear side in the drawing from the cross section in FIG. 11).

The movable fin 86F includes: a curved wall portion 86A that is curved in an arc shape about the hinge pin 86J in a vehicle front view; and a connecting wall portion 86B extending so as to connect the base end 86C to the curved wall portion 86A in a vehicle front view. The movable fin 86F includes an extending wall portion 86D extending from the base end 86C to the opposite side to the connecting wall portion 86B in a vehicle front view.

The movable fin 86F is configured to be turnable about an axis of the hinge pins 86J between a normal position 86FX and an operating position 86FY (a position indicated by two-dot chain lines) protruding vehicle-downward from the normal position 86FX. At the normal position 86FX, a fin portion 15A of an opening trim 15 is in elastic contact with the extending wall portion 86D of the movable fin 86F. At the operating position 86FY, the curved wall portion 86A is arranged in such a manner as to be continued to the outer end 84Z in the vehicle width direction of the fan case 84. The movable fin 86F is configured by using a soft material that is elastically deformable when the head PH of the occupant P hits the movable fin 86F. A shock absorbing stroke of the movable fin 86F when the head PH of the occupant P hits the movable fin 86F in a state in which the movable fin 86F is located at the operating position 86FY is set to be approximately equal to a protrusion amount of the operating position 86FY with respect to the normal position 86FX. The hinge pins 86J of the movable fin 86F are connected to a motor 86M (illustrated in a block view in the drawing), and the movable fin 86F is configured to be rotationally driven by the operation of the motor 86M.

In the present embodiment, a wind direction changing unit 86 is configured to include the movable fin 86F and the motor 86M. The wind direction changing unit 86 can be switched between a first mode and a second mode. In the first mode, the movable fin 86F is positioned at the normal position 86FX so as to direct the airflow toward the descending airflow AF3, and in the second mode, the movable fin 86F is positioned at the operating position 86FY so as to direct at least part of the airflow (see arrows 86W) toward the get-out direction side (outward in the vehicle width direction in the present embodiment) from the direction of the descending airflow AF3.

The motor 86M of the wind direction changing unit 86 is connected to the control unit 88. As shown in FIG. 10, the control unit 88 is also connected to the motor 48M (illustrated in a block view in FIG. 10) of the crossflow fan 48. Furthermore, in the present embodiment, there is provided a door opening-closing detecting unit 89 (illustrated in the block view in FIG. 10) that detects an opening-closing state of the side door 20, and the door opening-closing detecting unit 89 is connected to the control unit 88 and outputs a signal indicating the detected door opening-closing state to the control unit 88. The control unit 88 controls the crossflow fan 48 to be operated when the door open-close detecting unit 89 detects that the side door 20 is opened, more specifically, the control unit 88 controls the motor 48M of the crossflow fan 48 such that the wind power becomes wind power during the normal operation, and also controls the wind direction changing unit 86 to be switched to the first mode.

When the control unit 88 determines a possibility that the head PH of the occupant P shown in FIG. 9 may hit the upper part of the side door opening 18 based on the boarding information detected by the detecting device 82, the control unit 88 controls the crossflow fan 48 to be operated, more specifically, the control unit 88 controls the crossflow fan 48 such that the wind power becomes larger than that during the normal operation of the crossflow fan 48, and also controls the wind direction changing unit 86 shown in FIG. 10 to be switched from the first mode to the second mode. Specifically describing the above determination by the control unit 88, when the control unit 88 determines that a distance detected by the detecting device 82 is equal to or less than a predetermined value, it is determined that there is a possibility that the head PH of the occupant P shown in FIG. 9 may hit the upper part of the side door opening 18; and if this determination is made, the above control is executed.

Further, when the control unit 88 shown in FIG. 11 controls the wind direction changing unit 86 to be switched from the first mode to the second mode, the control unit 88 controls the motor 86M such that the movable fin 86F turns from the normal position 86FX to the operating position 86FY. In addition, when the control unit 88 controls the crossflow fan 48 such that the wind power becomes larger than that during the normal operation of the crossflow fan 48 shown in FIG. 10, the control unit 88 controls the motor 48M of the crossflow fan 48 to increase the rotational speed of the crossflow fan 48. Needless to mention that the generated airflow is increased in speed by increasing the rotational speed of the crossflow fan 48.

In the state after the wind direction changing unit 86 is switched from the first mode to the second mode as described above, as an example, when the control unit 88 determines that the distance detected by the detecting device 82 is more than a predetermined value, the control unit 88 controls the crossflow fan 48 such that the wind power becomes the wind power during the normal operation of the crossflow fan 48, and also controls the wind direction changing unit 86 to be switched from the second mode to the first mode. In addition, when the control unit 88 controls the wind direction changing unit 86 to be switched from the second mode to the first mode, the control unit 88 controls the motor 86M such that the movable fin 86F shown in FIG. 11 turns from the operating position 86FY to the normal position 86FX.

According to the present embodiment, in addition to the operation and effects of the first embodiment, the following operation and effects can be obtained. Note that the following operation is obtained when the ignition switch is turned ON and an occupant is about to get in the vehicle (a driver is picking up this occupant, as an example).

In the present embodiment, when the door opening-closing detecting unit 89 detects that the side door 20 shown in FIG. 10 is opened, the crossflow fan 48 is operated with the wind power during the normal operation while the movable fin 86F is positioned at the normal position 86FX. In other words, an air curtain is formed when the side door 20 is opened. Thereby, it is possible to suppress the cool air or warm air in the vehicle cabin 22 from being released from the side door opening 18, and also to suppress wind from blowing into the vehicle cabin 22 from the outside of the vehicle cabin 22, to thereby contribute to energy saving. Moreover, it is possible to prevent pollen, insects, smells outside the vehicle cabin 22, etc., from entering the vehicle cabin 22.

Here, when the distance detected by the detecting device 82 shown in FIG. 9, that is, the distance between the upper part of the side door opening 18 and the head PH of the occupant P who is about to get in the vehicle is equal to or less than a predetermined value, the airflow is formed as follows. That is, as shown by two-dot chain lines in FIG. 11, as the movable fin 86F is positioned at the operating position 86FY, at least part of the airflow from the upper blowing port 46B (see the arrows 86W) is directed toward the occupant who is about to get in the vehicle; and the wind power of the airflow becomes larger than the wind power during the normal operation of the crossflow fan 48 (see FIG. 10). Supplementing the description on the direction of the airflow 86W, when the movable fin 86F turns to the operating position 86FY, the air blowing out from the upper blowing port 46B tends to flow in the direction along the curved surface of the curved wall portion 86A due to the Coanda effect. As a result, the airflow 86W is directed toward the head PH of the occupant P who is about to get in the vehicle 10C, as shown in FIG. 9. Accordingly, the occupant P can be made aware that the head PH of the occupant P is likely to hit the upper part of the side door opening 18.

Fifth Embodiment

Figure 12:
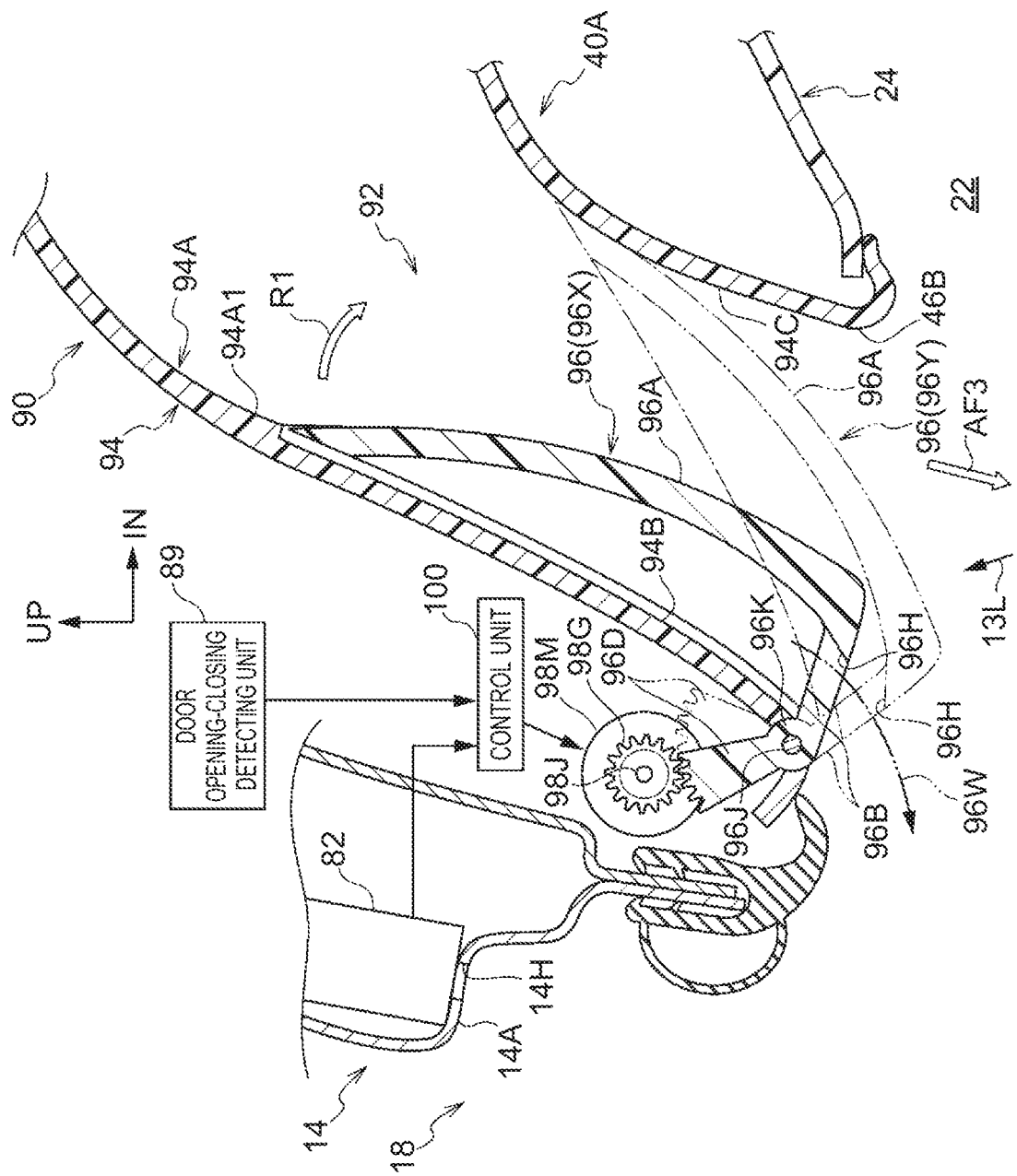
FIG. 12 is a longitudinal sectional view showing a configuration of an upper part on a lateral side of the vehicle including a part of a vehicle cabin airflow forming device according to a fifth embodiment.
Figure 13:
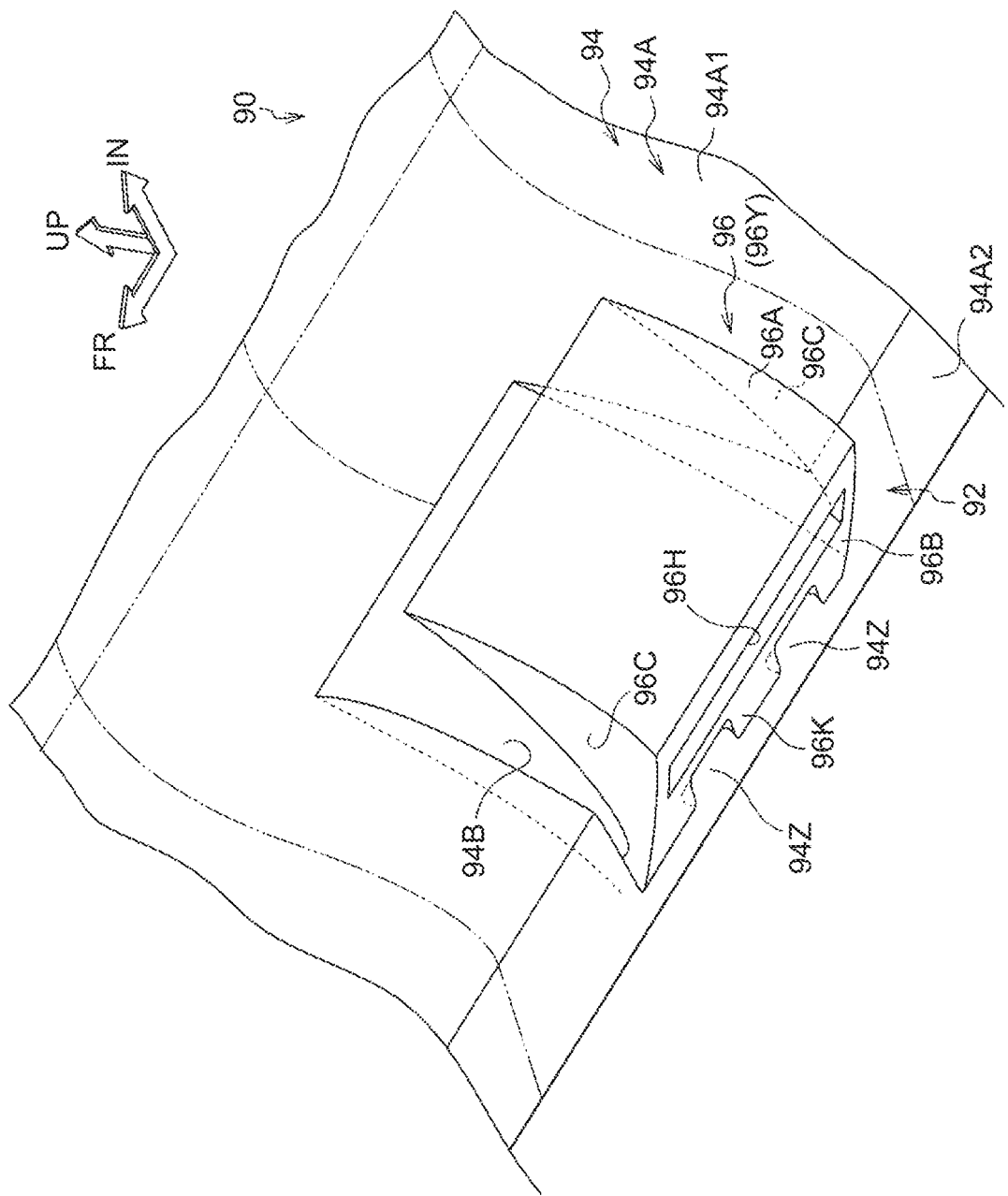
FIG. 13 is a perspective view showing a flap shown in FIG. 12 and a periphery thereof as viewed from an obliquely lower and inner side in the vehicle width direction.

Next, a vehicle cabin airflow forming device according to the fifth embodiment of the present disclosure will be described with reference to FIG. 12 and FIG. 13. FIG. 12 is a longitudinal sectional view showing a configuration around the upper part of the side door opening 18 and including a part of a vehicle cabin airflow forming device 90 according to the fifth embodiment. FIG. 13 shows a perspective view of a flap 96 shown in FIG. 12 and its periphery as viewed from the obliquely lower and inner side in the vehicle width direction (see the direction indicated by an arrow 13L in FIG. 12). The configuration of the present embodiment is substantially the same as that of the first embodiment except for the following points. In the following description, components that are substantially the same as those in the first and fourth embodiments will be denoted by the same reference numerals and description thereof will be omitted.

As shown in FIG. 13, a portion of a fan case 94 located outward in the vehicle width direction includes a recess 94B that is recessed in the vehicle width direction from a vertical wall portion 94A1 of a general portion 94A, as viewed from the obliquely lower and inner side in the vehicle width direction. A bottom surface of the recess 94B is set to have a step difference from the vertical wall portion 94A1 of the general portion 94A, and this step difference is gradually increased toward the vehicle lower side. This recess 94B is set at a position in the vehicle front-rear direction corresponding to a position where the occupant gets in the vehicle. The other configurations of the fan case 94 are substantially the same as those of the fan case 46 (see FIG. 3) in the first embodiment.

The recess 94B is provided with a flap 96. In other words, the flap 96 is provided to the upper blowing port 46B (see FIG. 12). This flap 96 includes: an airflow guide wall portion 96A that can be arranged to be aligned with the vertical wall portion 94A1 of the general portion 94A located on the outer side in the vehicle width direction of the fan case 94; and a bottom wall portion 96B that can be arranged to be aligned with a bottom wall portion 94A2 of the general portion 94A located on the outer side in the vehicle width direction of the fan case 94. The flap 96 includes side wall portions 96C formed integrally on both sides in the vehicle front-rear direction of a part ranging from the airflow guide wall portion 96A to the bottom wall portion 96B. A long hole 96H having a longitudinal direction extending in the vehicle front-rear direction is formed to penetrate the bottom wall portion 96B.

As shown in FIG. 12, hinge pins 96J arranged along the vehicle front-rear direction are fixed to base end attachment portions 96K of the flap 96. Each hinge pin 96J is rotatably attached to a hinge pin receiving portion 94Z on the outer side in the vehicle width direction of the fan case 94 shown in FIG. 13. As shown in FIG. 12, the flap 96 is turnable between a normal position 96X and an operating position 96Y about an axis of the hinge pin 96J. The normal position 96X is a position where a part ranging from the airflow guide wall portion 96A to the bottom wall portion 96B is aligned with a part ranging from the vertical wall portion 94A1 to the bottom wall portion 94A2 of the general portion 94A shown in FIG. 13. The operating position 96Y indicated by two-dot chain lines in FIG. 12 is a position where an upper end of the airflow guide wall portion 96A is in contact with the vertical wall portion 94C located on the inner side in the vehicle width direction of the fan case 94.

In the meantime, a gear portion 96D extends from each base end attachment portion 96K of the flap 96 obliquely upper and outer side in the vehicle width direction. The gear portion 96D meshes with a gear 98G for driving force transmission, and the gear 98G is coaxially fixed to an output shaft 98J of a motor 98M. As an example, the motor 98M is fixed to the fan case 94 via a bracket (not shown). As described above, as the motor 98M drivingly rotates, the flap 96 turns between the normal position 96X and the operating position 96Y.

In the present embodiment, a wind direction changing unit 92 is configured to include the recess 94B, the flap 96, the gear 98G, and the motor 98M. The wind direction changing unit 92 can be switched between a first mode and a second mode. In the first mode, the flap 96 is positioned at the normal position 96X so as to direct the airflow toward the direction of the descending airflow AF3, and in the second mode, the flap 96 is positioned at the operating position 96Y so as to direct at least a part of the airflow (see an arrow 96W) toward the get-out direction side (the outer side in the vehicle width direction in the present embodiment) from the direction of the descending airflow AF3.

The motor 98M of the wind direction changing unit 92 is connected to a control unit 100. As with the control unit 88 (see FIG. 10) of the fourth embodiment, the door opening-closing detecting unit 89 and the motor 48M of the crossflow fan 48 (for both, see FIG. 1, etc.,) are both connected to the control unit 100. When the door opening-closing detecting unit 89 detects that the side door 20 (see FIG. 10) is opened, the control unit 100 controls the motor 48M of the crossflow fan 48 such that the wind power becomes the wind power during normal operation (for both, see FIG. 1, etc.,), and the control unit 100 also controls the wind direction changing unit 92 to be switched to the first mode.

Moreover, as with the control unit 88 (see FIG. 10) of the fourth embodiment, the detecting device 82 is connected to the control unit 100. When the control unit 100 determines a possibility that the head PH of the occupant P may hit the upper part of the side door opening 18 based on the boarding information detected by the detecting device 82, the control unit 100 controls the motor 48M of the crossflow fan 48 (for both, see FIG. 10) in the same manner as the control unit 88 (see FIG. 10) of the fourth embodiment, and also controls the wind direction changing unit 92 to be switched from the first mode to the second mode. As with the control unit 88 (see FIG. 10) of the fourth embodiment, when the control unit 100 determines that the distance detected by the detecting device 82 is equal to or less than a predetermined value, the control unit 100 determines a possibility that the head PH of the occupant P may hit the upper part of the side door opening 18; and when making this determination, the control unit 100 executes the above control. When the control unit 100 controls the wind direction changing unit 92 to be switched from the first mode to the second mode, the control unit 100 controls the motor 98M such that the flap 96 turns from the normal position 96X to the operating position 96Y (see the direction indicated by an arrow R1).

In the state after the wind direction changing unit 92 is switched from the first mode to the second mode as described above, as an example, when the control unit 100 determines that the distance detected by the detecting device 82 is more than a predetermined value, the control unit 100 controls the crossflow fan 48 (see FIG. 10) such that the wind power becomes the wind power during the normal operation of the crossflow fan 48 (see FIG. 10), and also controls the wind direction changing unit 92 to be switched from the second mode to the first mode. When the control unit 100 controls the wind direction changing unit 92 to be switched from the second mode to the first mode, the control unit 100 controls the motor 98M such that the flap 96 turns from the operating position 96Y to the normal position 96X.

According to the present embodiment, in addition to the operation and effects of the first embodiment, the following operation and effects can be obtained. The following operation is obtained when the ignition switch is ON and the occupant is about to get in the vehicle.

In the present embodiment, when the door opening-closing detecting unit 89 detects that the side door 20 (see FIG. 10) is opened, the crossflow fan 48 (see FIG. 1, etc.) is operated with the wind power during normal operation while the flap 96 is positioned at the normal position 96X. When the distance detected by the detecting device 82, that is, the distance between the upper part of the side door opening 18 and the head PH of the occupant P about to get in the vehicle becomes equal to or less than a predetermined value, the following airflow is formed. That is, as indicated by the two-dot chain lines in FIG. 12, the airflow (see the arrow 96W) is directed more outward in the vehicle width direction than that during normal operation by positioning the flap 96 at the operating position 96Y, and the wind power of the airflow (see the arrow 96W) becomes larger than that that during the normal operation. As described above, it is possible to make the occupant notice that his or her head is likely to hit the upper part of the side door opening 18.

Sixth Embodiment

Figure 14:
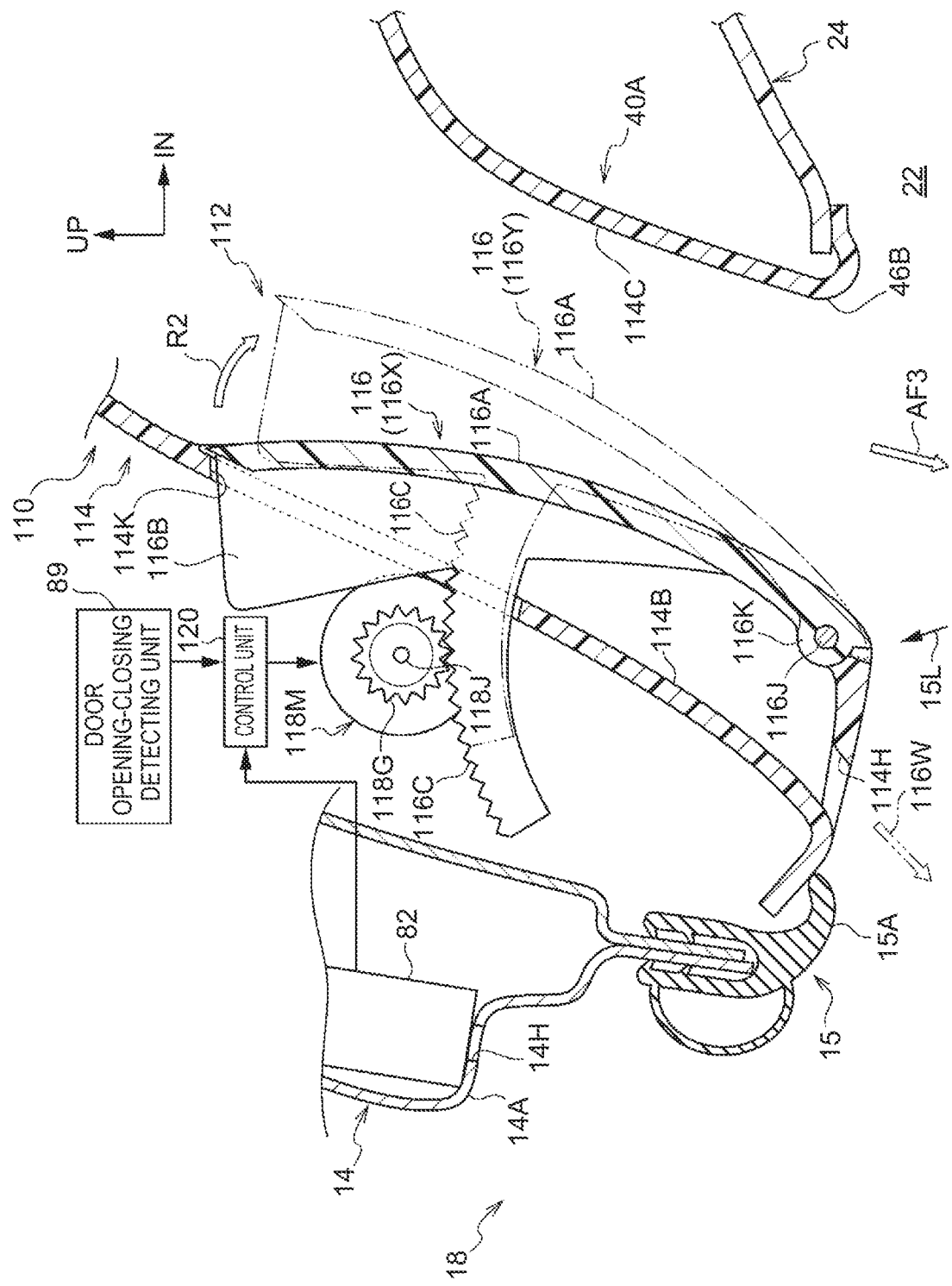
FIG. 14 is a longitudinal sectional view showing a configuration of an upper part on a lateral side of the vehicle including a part of a vehicle cabin airflow forming device according to a sixth embodiment.
Figure 15:
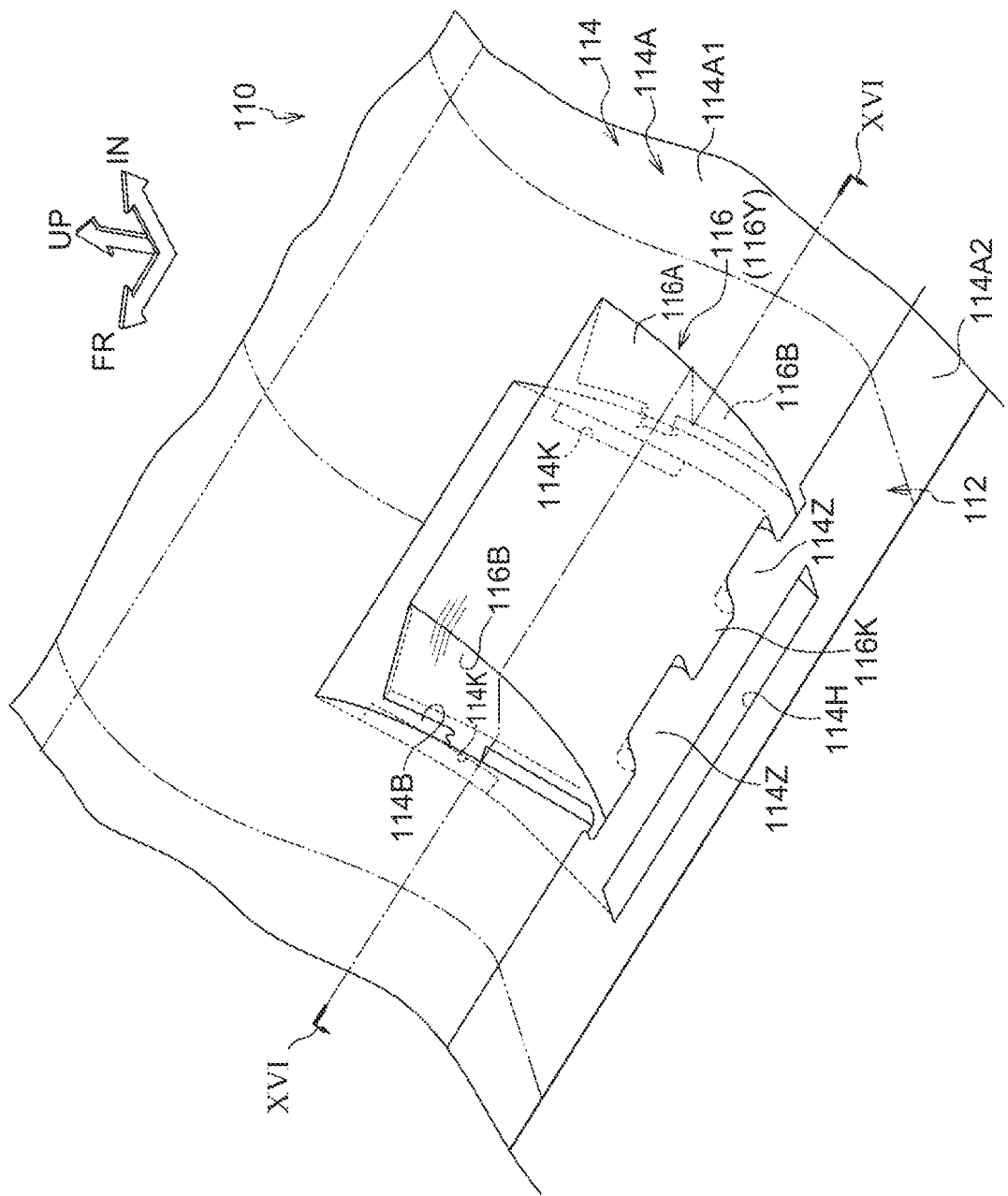
FIG. 15 is a perspective view showing a flap shown in FIG. 14 and a periphery thereof as viewed from an obliquely lower and inner side in the vehicle width direction.
Figure 16:
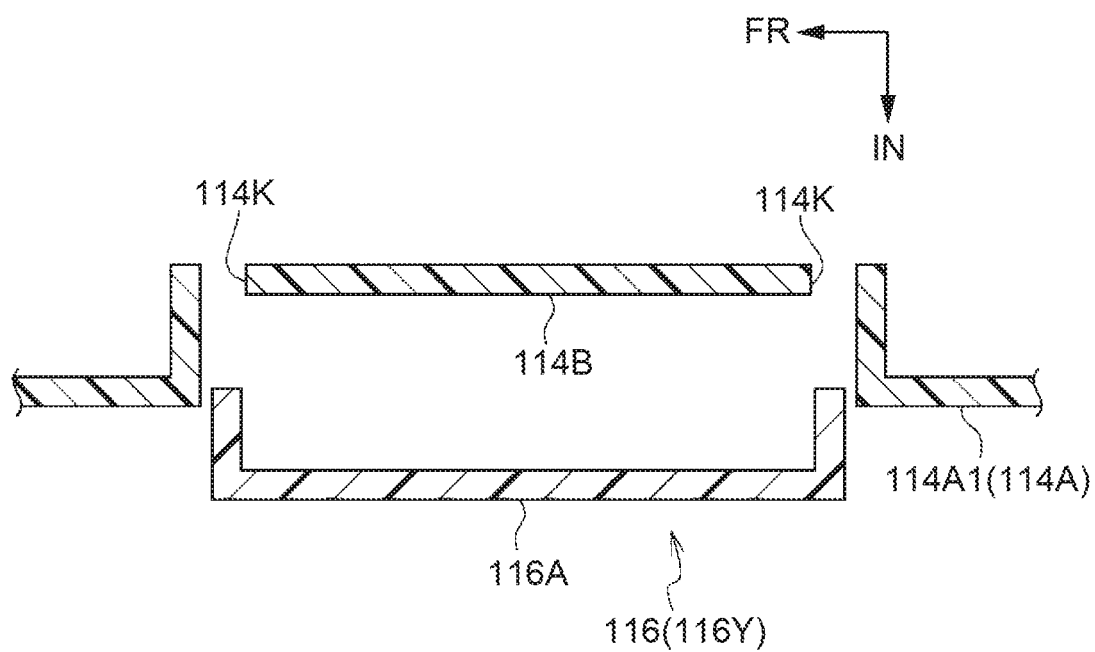
FIG. 16 is an enlarged sectional view showing a state taken along line XVI-XVI in FIG. 15.

Next, a vehicle cabin airflow forming device according to the sixth embodiment of the present disclosure will be described with reference to FIG. 14 to FIG. 16. FIG. 14 is a longitudinal sectional view showing a configuration around the upper part of the side door opening 18 and including a part of a vehicle cabin airflow forming device 110 according to the sixth embodiment. FIG. 15 shows a perspective view showing a flap 116 shown in FIG. 14 and its periphery as viewed from an obliquely lower and inner side in the vehicle width direction (see the direction of an arrow 15L in FIG. 14); and FIG. 16 shows an enlarged sectional view showing a state taken along line XVI-XVI in FIG. 15. The configuration of the present embodiment is substantially the same as that of the first embodiment except for the following points. In the following description, components that are substantially the same as those in the first and fourth embodiments will be denoted by the same reference numerals and description thereof will be omitted.

As shown in FIG. 15, an outer portion in the vehicle width direction of a fan case 114 includes a recess 114B that is recessed in the vehicle width direction from a vertical wall portion 114A1 of a general portion 114A, as viewed from the obliquely lower and inner side in the vehicle width direction. A bottom surface of the recess 114B is set to have a step difference from the vertical wall portion 114A1 of the general portion 114A, and this step difference is gradually increased toward the vehicle lower side. The recess 114B is set at a position in the vehicle front-rear direction corresponding to a position where the occupant gets in the vehicle.

In addition, long holes 114K extending in the height direction are formed through both ends in the vehicle front-rear direction of the recess 114B. Further, a long hole 114H whose longitudinal direction extends in the vehicle front-rear direction at a position in the vehicle front-rear direction corresponding to the recess 114B is formed through a bottom wall portion 114A2 of the general portion 114A located on the outer side in the vehicle width direction of the fan case 114. The other configurations of the fan case 114 are substantially the same as those of the fan case 46 (see FIG. 3) in the first embodiment.

The recess 114B is provided with a flap 116. In other words, the flap 116 is provided to the upper blowing port 46B (see FIG. 14). This flap 116 includes an airflow guide wall portion 116A that can be aligned with the vertical wall portion 114A1 of the general portion 114A located on the outer side in the vehicle width direction of the fan case 114. The flap 116 includes side wall portions 116B formed integrally on both sides in the vehicle front-rear direction of the airflow guide wall portion 116A. The side wall portions 116B extend from both sides in the vehicle front-rear direction of the airflow guide wall portion 116A toward the outer side in the vehicle width direction, and each have a substantially inverted triangular shape in which the upper side more greatly extends than the lower side does.

As shown in FIG. 14, hinge pins 116J disposed along the vehicle front-rear direction are fixed to the base end attachment portion 116K of the flap 116. Each hinge pin 116J is turnably attached to a hinge pin receiving portion 114Z on the outer side in the vehicle width direction of the fan case 114 shown in FIG. 15. As shown in FIG. 14, the flap 116 is turnable between a normal position 116X and an operating position 116Y about an axis of the hinge pin 116J. The normal position 116X is a position where the airflow guide wall portion 116A is aligned with the vertical wall portion 114A1 of the general portion 114A shown in FIG. 15. The operating position 116Y indicated by two-dot chain lines in FIG. 14 is a position where an upper part of the airflow guide wall portion 116A is located between the normal position 116X and a vertical wall portion 114C on the inner side in the vehicle width direction of the fan case 114.

In the meantime, a rack portion 116C extends from the side wall portion 116B of the flap 116 outward in the vehicle width direction. The rack portion 116C is formed in a circular arc shape about the hinge pin 116J in a vehicle front view, and has gear portion on an upper surface thereof. The rack portion 116C meshes with a gear 118G for driving force transmission, and the gear 118G is coaxially fixed to an output shaft 118J of a motor 118M. As an example, the motor 118M is fixed to the fan case 114 via a bracket (not shown). As described above, when the motor 118M drivingly rotates, the flap 116 turns between the normal position 116X and the operating position 116Y.

As shown in FIG. 14 and FIG. 16, in the state where the flap 116 is positioned at the operating position 116Y, an airflow path is formed more outward in the vehicle width direction than the airflow guide wall portion 116A of the flap 116. Further, in the state where the flap 116 is positioned at the operating position 116Y as shown in FIG. 14, the flow path of the airflow from the crossflow fan 48 (see FIG. 1, etc.,) is branched by the airflow guide wall portion 116A of the flap 116, to thereby divide the airflow.

In the present embodiment, a wind direction changing unit 112 is configured to include the recess 114B, the flap 116, the gear 118G, and the motor 118M. The wind direction changing unit 112 can be switched between a first mode in which the flap 116 is positioned at the normal position 116X so as to direct the airflow toward the direction of the descending airflow AF3, and a second mode in which the flap 116 is positioned at the operating position 116Y so as to direct at least part of the airflow (see an arrow 116W) toward the get-out direction (the outer side in the vehicle width direction in the present embodiment) from the direction of the descending airflow AF3.

The motor 118M of the wind direction changing unit 112 is connected to a control unit 120. As with the control unit 88 (see FIG. 10) of the fourth embodiment, the door opening-closing detecting unit 89 is connected to the control unit 120, and the motor 48M of the crossflow fan 48 (for both, see FIG. 1, etc.,) is also connected to the control unit 120. When the door opening-closing detecting unit 89 detects that the side door 20 (see FIG. 10) is opened, the control unit 120 controls the motor 48M of the crossflow fan 48 such that the wind power becomes the wind power during normal operation (for both, see FIG. 1, etc.,), and the control unit 120 controls the wind direction changing unit 112 to the first mode.

Moreover, as with the control unit 88 (see FIG. 10) of the fourth embodiment, the detecting device 82 is connected to the control unit 120. When the control unit 120 determines that the head PH of the occupant P may hit the upper part of the side door opening 18 based on the boarding information detected by the detecting device 82, the control unit 120 controls the motor 48M of the crossflow fan 48 (for both, see FIG. 10) in the same manner as the control unit 88 (see FIG. 10) of the fourth embodiment, and also controls the wind direction changing unit 112 to be switched from the first mode to the second mode. As with the control unit 88 (see FIG. 10) of the fourth embodiment, when the control unit 120 determines that the distance detected by the detecting device 82 is equal to or less than a predetermined value, the control unit 120 determines a possibility that the head PH of the occupant P may hit the upper part of the side door opening 18. When the control unit 120 makes such a determination, the control unit 120 performs the above control. When controlling the wind direction changing unit 112 to be switched from the first mode to the second mode, the control unit 120 controls the motor 118M such that the flap 116 turns from the normal position 116X to the operating position 116Y (see the direction indicated by an arrow R2).

In the state after the wind direction changing unit 112 is switched from the first mode to the second mode as described above, as an example, when the control unit 120 determines that the distance detected by the detecting device 82 is more than a predetermined value, the control unit 120 controls the crossflow fan 48 (see FIG. 10) to provide the wind power during normal operation of the crossflow fan 48 (see FIG. 10), and also controls the wind direction changing unit 112 to be switched from the second mode to the first mode. When the control unit 120 controls the wind direction changing unit 112 to be switched from the second mode to the first mode, the control unit 120 controls the motor 118M such that the flap 116 turns from the operating position 116Y to the normal position 116X.

According to the present embodiment, in addition to the operation and effects of the first embodiment, the following operation and effects can be obtained. The following operation is obtained when the ignition switch is ON and the occupant is about to get in the vehicle.

When the door opening-closing detecting unit 89 detects that the side door 20 (see FIG. 10) is opened, the crossflow fan 48 (see FIG. 1, etc.) is operated with the wind power during normal operation while the flap 116 is positioned at the normal position 116X. When the distance detected by the detecting device 82, that is, the distance between the upper part of the side door opening 18 and the head PH of the occupant P about to get in the vehicle becomes equal to or less than a predetermined value, the following airflow is formed. That is, by positioning the flap 116 at the operating position 116Y as indicated by two-dot chain lines in FIG. 14, the airflow (see an arrow 16W) is divided, and part of the divided airflow is directed more outward in the vehicle width direction than that during the normal operation, and the wind power of the airflow becomes larger than that during normal operation. As described above, it is possible to make the occupant notice that his or her head is likely to hit the upper part of the side door opening 18.

Supplementary Explanation of Embodiment

As a modification of the above embodiments, the vehicle cabin airflow forming device may be a device configured to form airflows circulating around the seating spaces S1, S3, S4, S5 of the seats 34, 38, 74, 76 during the operation of the device when the seats 34, 38, 74, 76 provided in the vehicle cabin 22 are viewed from the front side, to form, as part of the circulating airflows, an ascending airflow at a closing position (on one lateral side) of the side door 20 in the seating spaces S1, S3, S4, and S5, and to form a descending airflow on the lateral side (the other lateral side) of the inner side in the vehicle width direction of the seating spaces S1, S3, S4, S5.

As a modification of the above embodiments, the vehicle cabin airflow forming device may be configured such that an airflow generating unit generating an airflow by sucking the air in the flow path and blowing out the air to the flow path is not provided in the flow path of the circulating airflow. For example, the vehicle cabin airflow forming device may be a device configured to form an ascending airflow including air-conditioning air on one lateral side of the seating space, and to form a descending airflow including air-conditioning air on the other lateral side of the seating space, to thereby form airflows circulating around the seating spaces of the seats during operation of the device when the seats provided in the vehicle cabin are viewed from the front side.

Furthermore, as modifications of the fourth to sixth embodiments, the detecting unit may be a detecting unit configured to detect, as boarding information when an occupant is about to get in the vehicle, boarding information other than the "distance between the upper part of the side door opening 18 and the head PH of the occupant P", such as a moving direction of the head PH of the occupant P about to get in the vehicle, for example; and the control unit may be a control unit configured to control the crossflow fan 48 as the upper blower to be operated, and controls the wind direction changing unit 86 (92, 112) to be switched from the first mode to the second mode when the control unit determines a possibility that the head PH of the occupant P may hit the upper part of the side door opening 18 based on the boarding information detected by the detecting unit. For example, the control unit may be a control unit configured to determine a possibility that the head PH of the occupant P may hit the upper part of the side door opening 18 when the control unit determines the "movement direction of the head PH of the occupant P about to get in the vehicle" detected by the detecting unit is directed toward the upper part of the side door opening 18; and if the control unit determines this, the control unit controls the crossflow fan 48 to be operated, and controls the airflow direction changing unit 86 (92, 112) to be switched from the first mode to the second mode. In such a modification, the control unit may further be configured to control the crossflow fan 48 such that the wind power becomes larger than that during the normal operation of the crossflow fan 48.

Furthermore, the vehicle cabin airflow forming device may be applied to a vehicle having a configuration in which a plurality of seats provided in a vehicle cabin is aligned in the vehicle width direction, and the seats face one side in the vehicle front-rear direction, and may also be applied to a vehicle having a configuration in which a plurality of seats provided in a vehicle cabin is arranged in the vehicle front-rear direction, and the seats face one side in the vehicle width direction.

In addition, the aforementioned embodiments and the aforementioned modifications can be implemented by being appropriately combined.

Although an example of the present disclosure has been described above, the present disclosure is not limited to the above, and it is needless to mention that various modifications can be made without departing from the spirit of the present disclosure.

What is claimed is:

1. A vehicle cabin comprising:
a vehicle cabin airflow forming device configured to, when the vehicle cabin airflow forming device is operated:
form airflows circulating around a seating space of one of a plurality of seats provided in the vehicle cabin and aligned in the vehicle lateral direction, the plurality of seats being provided inside the vehicle cabin, the airflows circulating around the seating space as viewed from a front side of the one seat, and
form, as part of the airflows, an ascending airflow on one lateral side of the seating space, and a descending airflow on the other lateral side of the seating space,
wherein the vehicle cabin airflow forming device includes an airflow generating unit in a flow path of the airflows, the airflow generating unit being configured to generate airflows by sucking air in the flow path and blowing the air into the flow path,
wherein the airflow generating unit includes a first airflow generating unit and a second airflow generating unit,
wherein the first airflow generating unit includes:
an upper suction port that is provided on a vehicle ceiling side and into which air forming the ascending airflow is sucked;
an upper blowing port that is provided on the vehicle ceiling side and from which air forming the descending airflow is blown out; and
an upper blower configured to suck air from the vehicle cabin into the upper suction port and blow out the air from the upper blowing port into the vehicle cabin, and
wherein the second airflow generating unit includes:
a lower suction port mounted to a first lateral side of the one seat and into which air forming the descending airflow is sucked;
a lower blowing port mounted to a second lateral side of the one seat opposite the first lateral side of the one seat and from which air forming the ascending airflow is blown out, the lower blowing port is positioned within a gap between two seats of the plurality of seats in the vehicle cabin in the lateral direction; and
a lower blower configured to suck air from the vehicle cabin into the lower suction port and blow out the air from the lower blowing port into the vehicle cabin.

2. The vehicle cabin according to claim 1, wherein the other lateral side is located on a side of a closing position of a door configured to open and close a door opening for occupant ingress-egress.

3. The vehicle cabin according to claim 2, further comprising a detecting unit configured to detect boarding information when an occupant is about to get in the vehicle, wherein
the vehicle cabin airflow forming device includes:
a wind direction changing unit provided on the upper blowing port and configured to be switched between a first mode of directing the airflow to a direction of the descending airflow and a second mode of directing at least part of the airflow toward a get-out direction side from the direction of the descending airflow, the upper blowing port being provided on a vehicle ceiling side, and air forming the descending airflow being blown out from the upper blowing port; and
a control unit configured to
control the upper blower to be operated based on the boarding information detected by the detecting unit, the upper blower being configured to suck air in the vehicle cabin from an upper suction port and blow out the air from the upper blowing port into the vehicle cabin, the upper suction port being provided on the vehicle ceiling side, and air forming the ascending airflow being sucked into the upper suction port, and
control the wind direction changing unit to be switched from the first mode to the second mode.

4. The vehicle cabin according to claim 3, wherein:
the detecting unit is configured to detect a distance between an upper part of the door opening and a head of the occupant, as the boarding information; and
the control unit is configured to control the upper blower such that air power becomes larger than air power during a normal operation of the upper blower when the control unit determines that the distance detected by the detecting unit is equal to or less than a predetermined value.

5. The vehicle cabin according to claim 4, wherein the control unit is configured to determine that there is a possibility that a head of the occupant hits the upper part of the door opening when the control unit determines that the distance detected by the detecting unit is equal to or less than the predetermined value.

6. The vehicle cabin according to claim 3, wherein
the control unit is configured to control the upper blower to be operated when the control unit determines a possibility that a head of the occupant hits an upper part of the door opening based on the boarding information detected by the detecting unit.

7. The vehicle cabin according to claim 1, wherein the upper suction port extends in a vehicle front-rear direction.

8. The vehicle cabin according to claim 1, wherein:
the upper blower is configured to suck air from the vehicle cabin into the upper suction port and blow out the air from the upper blowing port toward the lower suction port in the vehicle cabin; and
the lower blower is configured to suck air from the vehicle cabin into the lower suction port and blow out the air from the lower blowing port toward the upper suction port in the vehicle cabin.

9. The vehicle cabin according to claim 1, wherein the gap is provided between a seat cushion of the two seats.

10. The vehicle cabin according to claim 1, further comprising:
a lower partitioning member extending along a seat front-rear direction between the two seats of the plurality of seats at a level of an upper part of a seat cushion of the two seats, the lower blowing port formed in the lower partitioning member;
a lateral partitioning member extending along the seat front-rear direction between the two seats of the plurality of seats above the lower partitioning member; and
a second lower blowing port formed in the lateral partitioning member above the lower blowing port.

* * * * *